(12) United States Patent
Mori et al.

(10) Patent No.: US 6,710,283 B2
(45) Date of Patent: Mar. 23, 2004

(54) LASER WELD QUALITY MONITORING METHOD AND SYSTEM

(75) Inventors: Kiyokazu Mori, Kanagawa-ken (JP); Taishi Tarui, Kanagawa-ken (JP); Shinsuke Takemura, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 8 days.

(21) Appl. No.: 10/081,153

(22) Filed: Feb. 25, 2002

(65) Prior Publication Data

US 2002/0144984 A1 Oct. 10, 2002

(30) Foreign Application Priority Data

Feb. 23, 2001 (JP) .................................... P2001-048756
Dec. 14, 2001 (JP) .................................... P2001-381889

(51) Int. Cl.$^7$ .............................................. B23K 26/00
(52) U.S. Cl. ........................... 219/121.64; 219/121.63; 219/121.83; 219/121.85
(58) Field of Search .................. 219/121.64, 121.63, 219/121.83, 121.85, 121.65, 121.66

(56) References Cited

U.S. PATENT DOCUMENTS

| | | | |
|---|---|---|---|
| 5,121,339 A | * 6/1992 | Jenuwine et al. | 364/507 |
| 5,272,312 A | 12/1993 | Jurca | |
| 5,360,960 A | 11/1994 | Shirk | |
| 5,486,677 A | 1/1996 | Maischner et al. | |
| 5,651,903 A | 7/1997 | Shirk | |
| 5,674,415 A | * 10/1997 | Leong et al. | 219/121.83 |
| 5,728,992 A | * 3/1998 | Swidwa | 219/121.64 |
| 5,961,859 A | * 10/1999 | Chou et al. | 219/121.63 |
| 6,084,223 A | * 7/2000 | Dietz et al. | 219/617 |
| 6,344,625 B1 | * 2/2002 | Kim et al. | 219/121.62 |
| 6,399,915 B1 | * 6/2002 | Mori et al. | 219/121.83 |
| 6,455,803 B1 | * 9/2002 | Fields, Jr. et al. | 219/121.63 |

FOREIGN PATENT DOCUMENTS

| | | |
|---|---|---|
| DE | 100 13 892 | 12/2000 |
| JP | 2000-271768 | 10/2000 |
| WO | WO 00/41837 | 7/2000 |

OTHER PUBLICATIONS

Zimmerman et al., "Aspects for Quality Assurance with a Plasma–Monitoring System During Laser Beam Welding," *Laser In Der Technik: Vortraege Des Internationales Kongresses Laser. Laser in Engineering* (1994), pp. 503–510, XP000607667.

Jurca, "On–Line Monitor for the $CO_2$–Laser Welding Process," *Laser In Der Technik: Vortraege Des Internationales Kongresses Laser. Laser in Engineering* (1994), pp. 499–502, XP000607668.

Patent Abstracts of Japan, vol. 1997, No. 02, Feb. 28, 1997 & JP 08 281456 A (Nissan Motor Co. Ltd.), Oct. 29, 1996 (Abstract).

Patent Abstracts of Japan, vol. 1998, No. 05, Apr. 30, 1998 & JP 10 006051 A (Nissan Motor Co. Ltd.), Jan. 13, 1998 (Abstract).

Patent Abstracts of Japan, vol. 2000, No. 13, Feb. 5, 2001 & JP 2000 271768 A (Nissan Motor Co. Ltd.), Oct. 3, 2000 (Abstract).

* cited by examiner

*Primary Examiner*—M. Alexandra Elve
(74) *Attorney, Agent, or Firm*—Foley & Lardner

(57) ABSTRACT

Infrared reflection of a laser beam (LB3) irradiated on a welding part (WP) of work (5) is detected by a sensor (6a) high of elevation angle, where it is converted into an electrical signal, which is processed by a measuring circuit (MC) to be input to a quality monitor (QM), where it is stored as a data in a memory (7g), which data is processed by way of a spectral analysis, which calculates a spectral distribution of electrical signal, and a signal power sum in a particular frequency band, to be compared with a threshold value for decision on occurrence of a significant porous state.

17 Claims, 20 Drawing Sheets

FIG.9 DETECTED WAVEFORMS UNDER BASIC WELDING CONDITIONS

FIG.10 DETECTED WAVEFORMS UNDER BASIC WELDING CONDITIONS

FIG.15

TABLE-1

| LOWER/UPPER | UPPER SHEET $t_1$ | | |
|---|---|---|---|
| | 0.8mm | 1.0mm | 1.2mm |
| LOWER SHEET $t_2$   0.8mm | 3.5m/min. | 3.5m/min. | 3.5m/min. |
| ″ | 4.0m/min. | | |
| ″ | 4.5m/min. | | |
| ″ | 5.0m/min. | | |
| 1.0mm | 3.5m/min. | | |
| 1.2mm | 3.0m/min. | | |
| ″ | 3.5m/min. | | 3.5m/min. |
| ″ | 4.0m/min. | | |

LASER WELD QUALITY MONITORING METHOD AND SYSTEM

BACKGROUND OF THE INVENTION

The present invention relates to a laser weld quality monitoring method and system. In particular, the invention relates to a laser weld quality monitoring method and system adapted to monitor a quality of a YAG laser weld, such as for an occurrence of a porous, under-filled, or non-welded status.

The welding of very thin steel sheets, such as for a vehicle body, is performed by a laser welding. In comparison with a spot welding, the laser welding has many advantages such that it is applicable to a one-side welding without the need of clamping steel sheets from both obverse and reverse, and that it allows an easy welding even at an inside of a complicate narrow groove. However, as a disadvantage, it tends to suffer a degradation of welding quality caused by a failed lapping accuracy between steel sheets or accrued suddenly at a stained welding part.

Therefore, the monitoring of a laser weld is performed by predicting a weld quality in a real-time manner. Japanese Patent Application Laying-Open Publication No. 2000-271768 has disclosed techniques of using a pair of sensors having their detection angles different from each other, for sensing intensities of light from a plume occurring at a keyhole of a weld by a YAG (Yurium Aluminum Garnet) laser and reflection of light of the YAG laser, to detect variations of output, welding, and inter-sheet gap as welding conditions, thereby performing a real-time prediction of a quality of the laser weld.

SUMMARY OF THE INVENTION

For the conventional method of monitoring a quality of laser weld, it is possible to detect occurrences of a significant grooved state of weld (hereafter sometimes referred to as "under-filled" state or simply "under-fill") and a non-conforming state of weld significantly deviated from a specified welding condition (hereafter sometimes referred to as "non-conforming" state or simply "non-conformity"). It however is difficult to detect an occurrence of a significant porous state of weld (hereafter sometimes referred to as "porous" state or simply "porosity" or "pore").

The difficulty in detection of an occurrence of porous state in the conventional weld quality monitoring method resides in that a decision on quality is made of a state of weld based on the intensity of light emitted from a melt (with a "keyhole") irradiated by a laser beam, irrespective of the fact that the porous state is caused by a mixing of zinc vapor inside the keyhole, which mixing seldom imparts significant variations in the intensity of emitted light from the keyhole.

Moreover, in a lap welding, if the inter-sheet gap is too great, there occurs an incomplete welding as a failure of weld between lapped steel sheets (hereafter sometimes referred to as "non-welded" state or "failed lap weld"), of which detection also is difficult in the conventional weld quality monitoring method.

Furthermore, in the conventional weld quality monitoring method, occurrences of the porous state, weld state such as an under-filled excepting a non-welded, and non-conforming state can be detected in different manners depending on the weld state, so that their detection needs a very complicate calculation process, with a commensurate great burden to be imposed on a CPU (central processing unit) for the calculation process.

Still more, in the conventional weld quality monitoring method which allows a facilitated detection of an occurrence of a porous state, weld state such as an under-filled excepting a non-welded, or non-conforming state over an entire welding region, if the occurrence of such a state is localized merely in part of the welding region, it also is uneasy to detect this state.

The present invention is made with such points in view. It therefore is an object of the invention to provide a laser weld quality monitoring method and system allowing for an ensured detection of occurrences of weld states such as a porous, under-filled, and non-welded, without an undesirable increase of burden imposed on a processing capacity of CPU, as well as for that of localized occurrences of weld states such as a porous, under-filled, and non-welded, in a welding region by a YAG laser.

As a solution to achieve the object, according to an aspect of the present invention, there is provided a laser weld quality monitoring method comprising: welding a part of work with a laser beam irradiated thereon from a YAG laser; detecting a varying intensity of light reflected from the welding part to provide a detection signal; determining a value of signal power of a frequency spectrum in a specified frequency band of the detection signal; and making a decision for a porous state of the welding part to be significant as the value of signal power exceeds a threshold of weld quality, and to be insignificant as the value of signal power does not exceed the threshold of weld quality.

According to another aspect of the present invention, there is provided a laser weld quality monitoring method comprising: irradiating a laser beam from a YAG laser to a welding part of work; detecting light reflected from the welding part; calculating a frequency distribution from a set of data of the detected light within a interval of time; calculating, from the frequency distribution, a first signal power sum in one of a first frequency band for detecting an under-filled state and a second frequency band for detecting a porous state, and a second signal power sum in a third frequency band for detecting a non-welded state; mapping a combination of calculated values of the first and second signal power sums, in a region defined by a combination of a first axis representing the first signal power sum and a second axis representing the second signal power sum, including a sub-region representing a non-conforming state as one of the under-filled state, the porous state, and the non-welded state; and making a decision for the welding part to have the non-conforming state, as the combination of calculated values is mapped in the sub-region.

Further, to achieve the object described, according to another aspect of the present invention, there is provided a laser weld quality monitoring system comprising: a welder configured to weld a part of work with a laser beam irradiated thereon from a YAG laser; a detector configured to detect a varying intensity of light reflected from the welding part to provide a detection signal; a value determiner configured to determine a value of signal power of a frequency spectrum in a specified frequency band of the detection signal; and a decision-maker configured to make a decision for a porous state of the welding part to be significant as the value of signal power exceeds a threshold, and to be insignificant as the value of signal power does not exceed the threshold.

According to another aspect of the present invention, there is provided a laser weld quality monitoring system comprising: a laser welder configured to irradiate a laser beam from a YAG laser to a welding part of work; a detector configured to detect light reflected from the welding part; a calculator configured to calculate a frequency distribution from a set of data of the detected light within a interval of time; a calculator configured to calculate, from the frequency distribution, a first signal power sum in one of a first frequency band for detecting an under-filled state and a second frequency band for detecting a porous state, and a second signal power sum in a third frequency band for detecting a non-welded state; an operator configured to map a combination of calculated values of the first and second signal power sums, in a region defined by a combination of a first axis representing the first signal power sum and a second axis representing the second signal power sum, including a sub-region representing a non-conforming state as one of the under-filled state, the porous state, and the non-welded state; and a decision-maker configured to make a decision for the welding part to have, the non-conforming state, as the combination of calculated values is mapped in the sub-region.

BRIEF DESCRIPTION OF THE ACCOMPANYING DRAWINGS

The above and further objects aid novel features of the present invention will more fully appear from the following detailed description when the same is read in conjunction with the accompanying drawings, in which:

FIG. 15 is an exemplary table stored in a memory of the quality monitor in the measuring system;

DETAILED DESCRIPTION OF THE PREFERRED EMBODIMENTS

Figure 1:
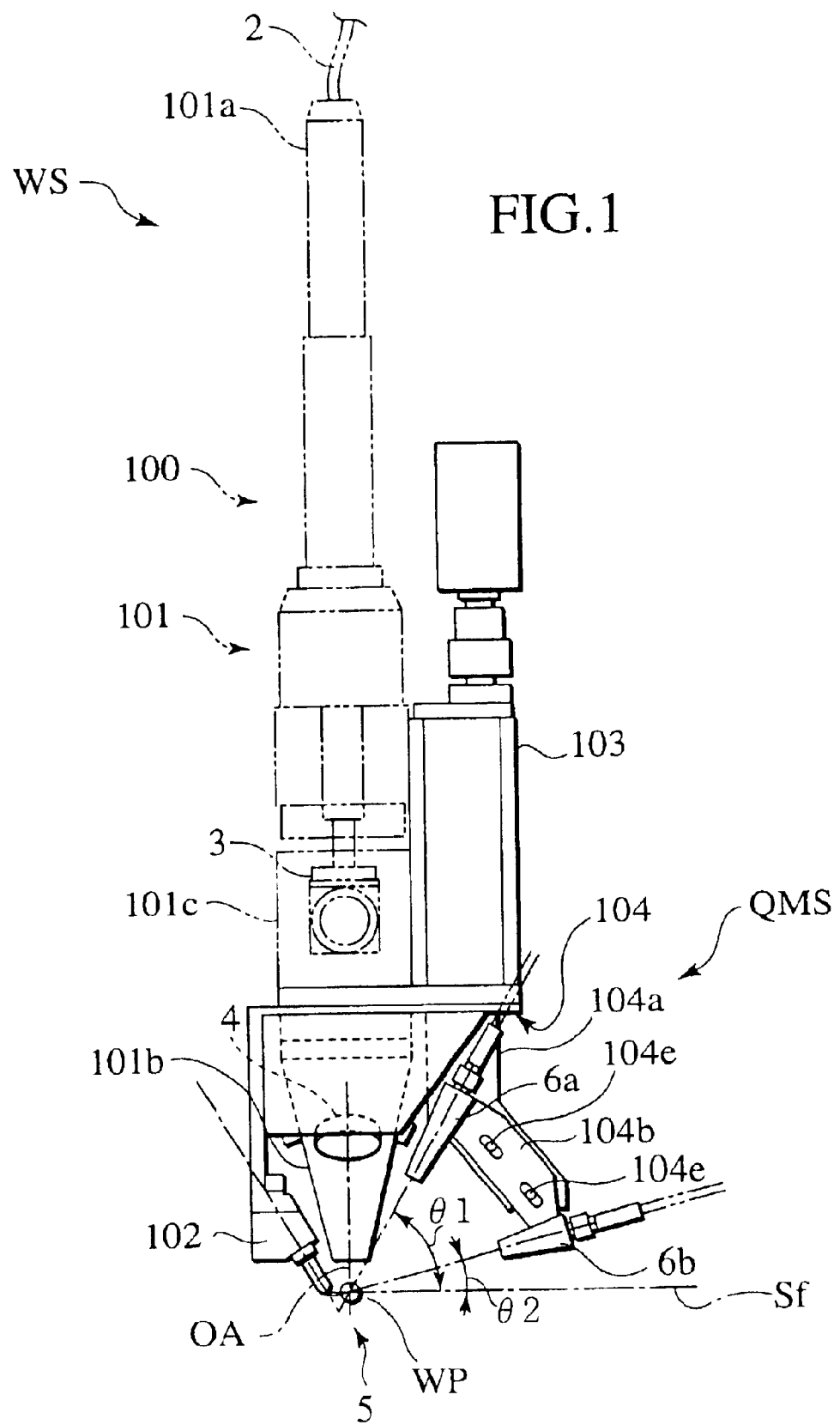
FIG. 1 is a fragmentary side view of a weld quality monitoring system according to an embodiment of the invention, as it is applied to a YAG laser welder of a welding system.

There will be detailed below the preferred embodiments of the present invention with reference to the accompanying drawings. Like members are designated by like reference characters.

First Embodiment

Figure 2:
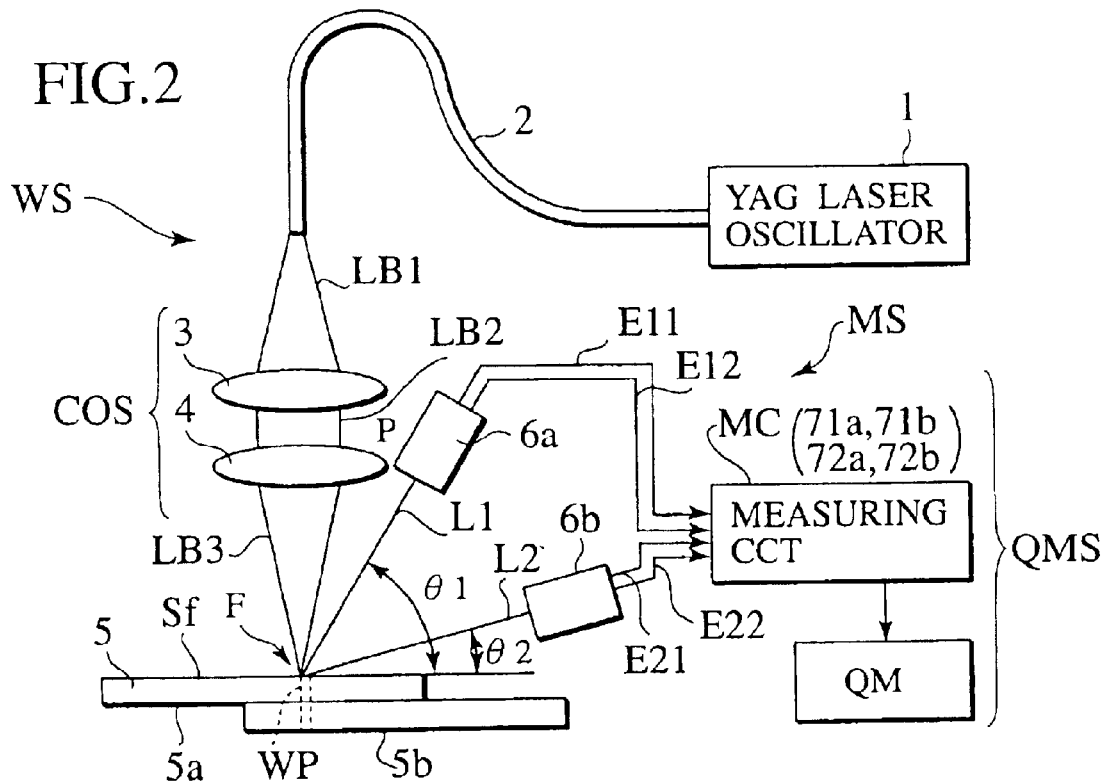
FIG. 2 is an illustrated conceptual constitution of the welding system equipped with the weld quality monitoring system of FIG. 1.
Figure 3:
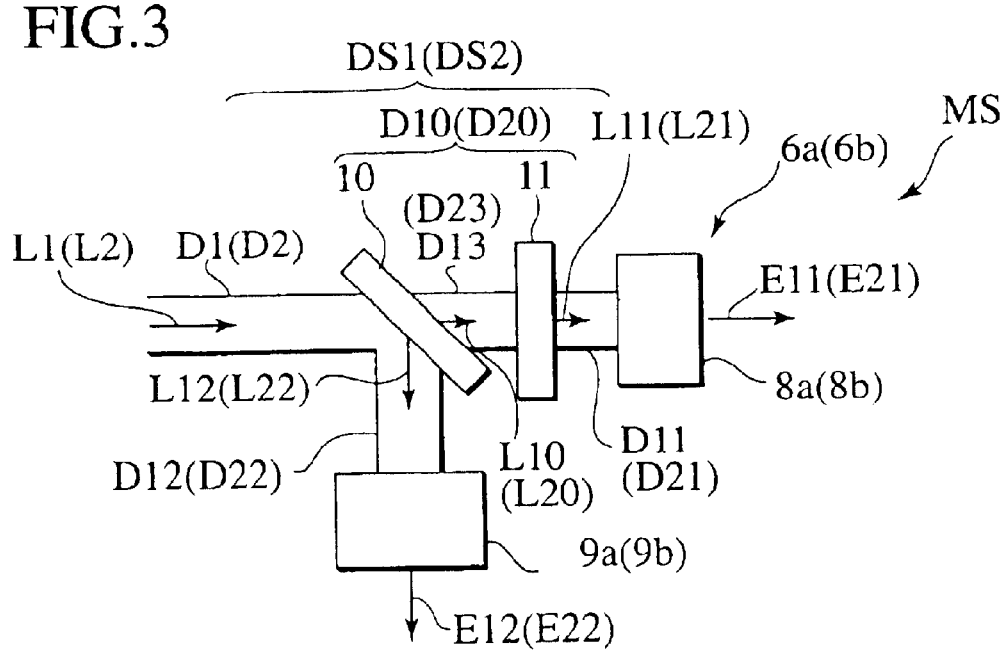
FIG. 3 is a block diagram of a combination of a diffraction system and a pair of photo-diodes connected thereto in a P(photo)-E(electric) converting sensor of a measuring system of the weld quality monitoring system.
Figure 4:
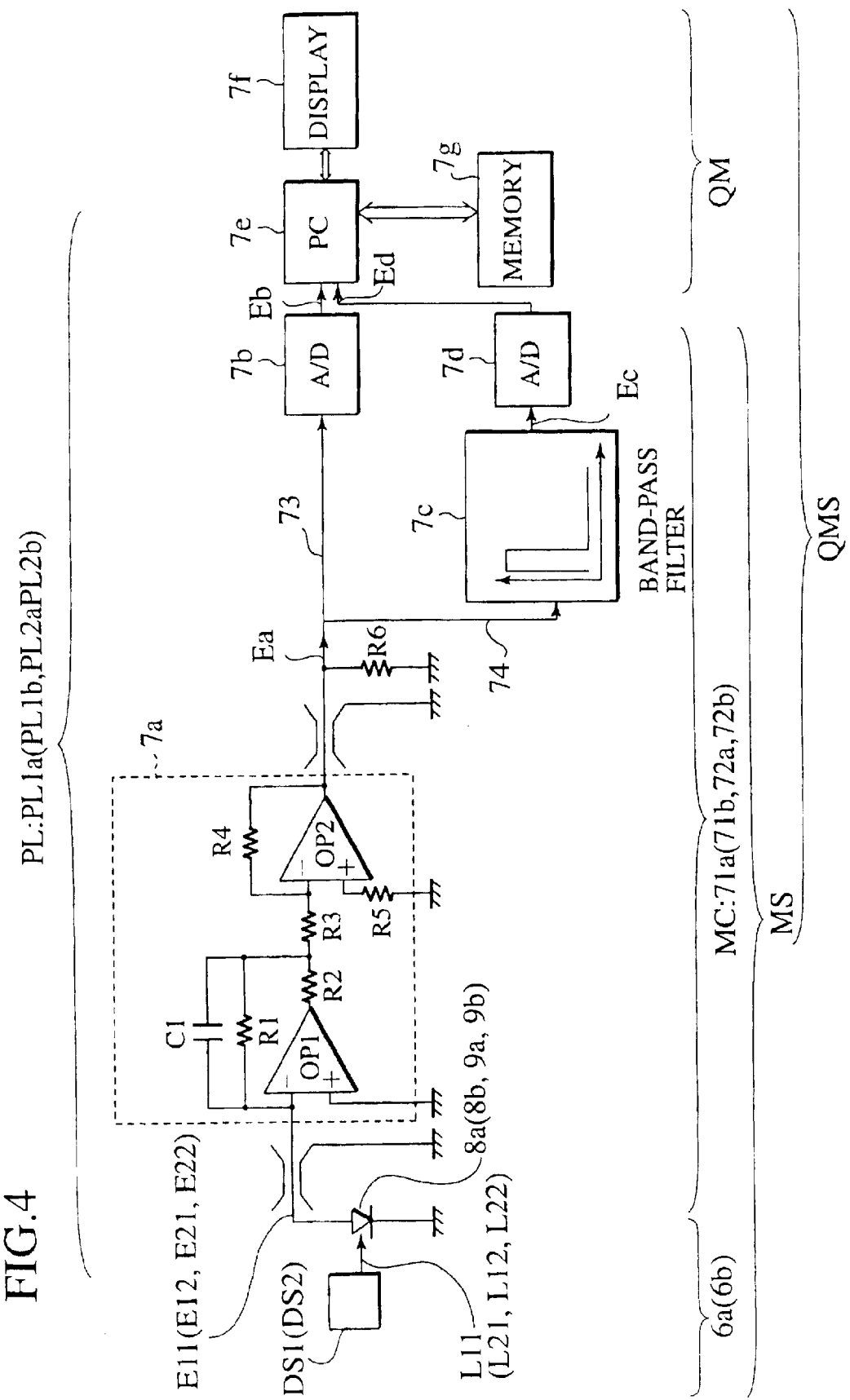
FIG. 4 is a block diagram of a combination of the diffraction system, a signal processing line configured with a photo-diode and a measuring circuit connected thereto in the measuring system, and a quality monitor of the weld quality monitoring system.

FIG. 1 shows an essential portion of a weld quality monitoring system QMS according to an embodiment of the invention, as it is applied to a YAG laser welder 100 of a welding system WS for a vehicle body fabrication line of an automobile factory, FIG. 2 illustrates a conceptual constitution of the welding system WS equipped with the weld quality monitoring system QMS, FIG. 3 shows a combination of a diffraction system DS1 and a pair of photo-diodes 8a, 9a connected thereto in a P-E converting sensor of a measuring system MS of the weld quality monitoring system QMS, and FIG. 4 shows a combination of the diffraction system DS1, a signal processing line PL1a configured with one 8a of the pair of photo-diode and a measuring circuit 71a connected thereto in the measuring system MS, and a quality monitor QM of the weld quality monitoring system QMS.

The welding system WS includes the YAG laser welder 100 and a YAG laser oscillator 1. As shown in FIG. 1, the laser welder 100 is assembled as a combination of a laser gun 101, a paint blast nozzle 102 (or protective gas discharge nozzle or electric welder), and a paint supply system 103 (or gas supply system or welding transformer), which are held in their cooperative positions by a common holder 104. In the Figures, the laser welder 100 is set in a vertical position, where the laser gun 101 has, at a top part 101a (as an input end) thereof, an optical fiber cable 2 connected thereto for introducing, into the welder 100, a laser beam LB1 optically conducted (as flux of light with a diverging tendency) from die laser oscillator 1. The laser gun 101 has, between the above-noted top part 101a and a bottom part 101b (as an output end) thereof, an intermediate lance part 101c configured as a light converging optical system COS (FIG. 2) for converging the introduced laser beam LB1.

More specifically, the optical system COS has a collimator lens 3 for collimating the diverging laser beam LB1 into a collimated laser beam LB2 as parallel flux of light, and a light converging lens 4 for converging the collimated laser beam LB2 to be focused as a converged laser beam LB3 on a focal point F to be set in accurate position to a welding part WP of work 5 (as a lapped combination of vehicle body panel members 5a, 5b) to be lap welded. It is noted that the welding part WP is a part (of melt region+associated weld) under observation (i.e. monitoring), with a laser-irradiated welding point inclusive, and has a length (e.g. 30 mm as in FIG. 25) corresponding to an interval of bead (hereinafter sometimes called "bead section" or simply "bead", when re-solidified) for which a prediction of weld quality is made on the basis of observation (i.e. by the monitoring). At the welding part WP, its constituent materials are once melt by energy of the laser beam LB3, before solidification of the melt by which the work 5 is to be lap welded at the part WP.

The weld quality monitoring system QMS is constituted with the measuring system MS (FIGS. 2–4) and the quality monitor QM (FIGS. 2, 4) communicating therewith. The measuring system MS includes a pair of photoelectric sensors 6a, 6b (FIGS. 1–4, 6) and a set of four measuring circuits 71a, 71b, 72a, 72b (hereafter sometimes collectively referred to as "MC", FIGS. 2, 4) electrically connected thereto. As illustrated in FIG. 1, the pair of sensors 6a, 6a are disposed, by use of a common bracket 104b angularly adjustably fastened by bolts 104, 104e to a yoke 104a of the common holder 104 of the laser welder 100, in their relatively fixed positions (90 −θ1=30 degrees and 90 −θ2=80 degrees relative to an optical axis OA) at a lateral side of the bottom part 101b of the laser gun 101, such that one sensor 6a functions as a reflected light detector in a first position at a first angle θ1 of elevation to be 60 degrees relative to a concerned surface Sf of work 5, and the other sensor 6b functions as a plasmatic light detector in position at a second angle θ2 of elevation to be 10 degrees relative to the surface Sf of work 5. As illustrated in FIG. 2, the former sensor 6a makes a detection of such portion L1 (FIGS. 2, 3, 5) of light of the laser beam LB3 that is reflected, and not absorbed, by (a front periphery 26f of a melt region 26, FIG. 5, in) the welding part WP where the beam LB3 is irradiated. The latter sensor 6b makes a detection of such portion L2 (FIGS. 2, 3, 6) of light emitted from a plume 28 (hot metal plasma, FIG. 5) developed in the welding part WP.

In the weld quality monitoring system QMS, there is made a real-time decision on the quality of weld at the welding part WP, based on that portion L1 of reflected light which is detected by the sensor 6a and that portion L2 of plasmatic light which is detected by the sensor 6b. It is noted the sensor 6a is essential to the present embodiment which employs reflection of laser beam for detection of a porous state of weld to be significant in porosity.

The sensor 6a positioned at the first angle θ1 of elevation is adapted as a P-E converter for converting instantaneous varying intensities of respective diffracted light L11, L12 (FIG. 3) of the detected portion L1 of reflected light of the laser beam LB3 into corresponding electrical signals E11, E12 (FIGS. 2–4) with instantaneous amplitudes proportional to the intensities of the diffracted light L11, L12, respectively. The sensor 6b positioned at the second angle θ2 of elevation is adapted as a P-E converter for converting instantaneous varying intensities of diffracted light L21, L22 (FIG. 3) of the detected portion L2 of emitted light from the plasmatic plume 28 into corresponding electrical signals E21, E22 (FIGS. 2–4) with instantaneous amplitudes proportional to the intensities of the diffracted light L21, L22, respectively.

More specifically, as shown in FIG. 3, the reflected light sensor 6a is configured with: a diffraction system DS1 (FIGS. 3, 4), which has an input path D1 for inputting a portion L1 of reflected light available for detection, a diffracter D10 for diffracting the input light L1 into diffracted light L11, L12 (as flux of finally diffracted components of the input light L1), and first and second output paths D11, D12 for conducting the diffracted light L11, L12; and first and second photo-diodes 8a, 9a installed in the output paths D11, D12 for detecting the intensities of diffracted light L11, L12, respectively. Likewise, the plasmatic light sensor 6b is configured with: a diffraction system DS2 (FIGS. 3, 4), which has an input path D2 for inputting a portion L2 of plasmatic light available for detection, a diffracter D20 for diffracting the input light L2 into diffracted light L21, L22 (as flux of finally diffracted components of the input light L2), and first and second output paths D21, D22 for conducting the diffracted light L21, L22; and first and second photo-diodes 8b, 9b installed in the output paths D21, D22 for detecting the intensities of diffracted light L21, L22, respectively.

The diffracter D10 (or D20 vice versa) has a dichroic mirror 10 installed at a branching point between the input and output paths D1 (D2) and D11, D12 (D21, D22). This mirror 10 serves: for transmitting, toward the first output path D11 (D21), flux of such components of input light L1 (L2) that have longer wavelengths than a specified wavelength (500 nm in this examppple), as initially diffracted light L10 (L20); and for reflecting, toward the second output path D12 (D22), flux of such visible components of the input light L1 (L2) that have wavelengths not exceeding the specified wavelength (500 nm), as the diffracted light L12 (L22) to be input to the second photo-diode 9a (9b), where its intensity is converted into the electrical signal E12 (E22) to be output to a corresponding measuring circuit 71a (72a). Further, the diffractor D10 (D20) has, at the end of its optical path D13 (D23) connected to the first output path D11 (D21), an interference filter 11 for transmitting, toward this output path D11 (D21), mere flux of such components of the initially diffracted light L10 (L20) that have wavelengths within a specified range (1064±10 nm corresponding to YAG laser of 1.06 $\mu$m, in this example), as the diffracted light L11 (L21) to be input to the first photo-diode 8a (8b), where its intensity is converted into the electrical signal E11 (E21) to be output to a corresponding measuring circuit 71b (72b).

In other words, at the sensor 6a (or 6b vice versa), first, light L1 (L2) striking thereto (at the left end in FIG. 3) from the welding part WP is separated by the dichroic mirror 10 in a wavelength selecting manner, so that, on the one hand, flux of visible rays of light L12 (L22) having wavelengths nor exceeding 500 nm are reflected by the mirror 10 and conducted (as a set of plasmatic components of light) to the photo-diode 9a (9b), where its varying intensity is converted into the electrical signal E12 (E22). On the other hand, of the striking light L1 (L2) from the welding part WP, flux of infrared rays of light L10 (L20) having passed the dichroic mirror 10 further strikes the interference filter 11, where flux of mere such components of light that reside within the above-noted wavelength range corresponding to light of YAG laser having a 1.06 μm wavelength is transmitted to be conducted to the photo-diode 8a (8b), where its varying intensity is converted into the electrical signal E11 (E21) to be output to the measuring circuit 71a (72a). It is noted that the photo-diode 8a and the measuring circuit 71a cooperatively constitute a first signal processing line PL1a (FIG. 4) in the measuring system MS, which line Pl1a is employed for detection of an occurrence of significant porosity in the weld to be monitored by use of reflection of the laser beam LB3 in this embodiment.

More specifically, in the weld quality monitoring system QMS, the measuring system MS has two diffraction systems DS1 and DS2, four photo-diodes 8a, 9a and 8b, 9b, and four measuring circuits 71a, 71b and 72a, 72b. As described, the first signal processing line PL1a is constituted as a combination of the photo-diode 8a connected to the diffraction system DS1 and the measuring circuit 71a. Likewise, a combination of the photo-diode 9a connected to the diffraction system DS1 and the measuring circuit 71b constitutes a second signal processing line PL1b; a combination of the photo-diode 8b connected to the diffraction system DS2 and the measuring circuit 72a constitutes a third signal processing line PL2a; and a combination of the photdiode 9b connected to the diffraction system DS2 and the measuring circuit 72b constitutes a fourth signal processing line PL2b.

As shown for the first signal processing line PL1a in FIG. 4, the measuring circuit 71a (or 71b; or 72a or 72b, vice versa) is configured with: a pre-stage amplifier 7a for amplifying the electrical signal E11 (E12; E21, E22) from the photo-diode 8a (8b; 9a, 9b) into an electrical analog signal Ea having a necessary level for subsequent processing; and a pair of signal processing circuits 73, 74 of which one 73 is formed by an A/D) (analog-to-digital) converter 7b) for converting the analog signal Ea output from the amplifier 7a into a corresponding digital signal Eb, and the other 74 is formed as a combination of a band-pass filter 7c for passing a set of such signal components of the analog signal Ea that reside within a specified frequency band, as a band-pass-filtered analog signal Ec, and an A/D converter 7d for converting the analog signal Ec into a corresponding digital signal Ed. In the measuring circuit 71a (71b; 72a, 72b, FIG. 4), designated by reference characters OP1 and OP2 are operational amplifiers, R1 to R6 are resistors, and C1 is a capacitor.

The quality monitor QM is configured with a PC (personal computer) 7e connected to the signal processing circuits 73, 74 of each signal processing line PL, a touch-panel type display 7f connected to the PC, and an internal or external memory 7g provided for the PC. The PC 7e is adapted, by programs to be read therein from the memory 7g, for necessary functions to execute various processes described herein, including those for calculating a frequency distribution of harmonic components of input signal (Eb), calculating a value of signal power in a specified frequency band of input signal (Eb or Ed), and making a decision on a quality of weld at the welding part (WP), with a porous state of the weld inclusive. The display 7f indicates various image frames sent from the PC, including that of a resultant decision on the weld quality. The memory 7g includes ROM (read only memory) and RAM (random access memory) for storing various programs and data, as necessary for the monitoring described herein.

Figure 5:
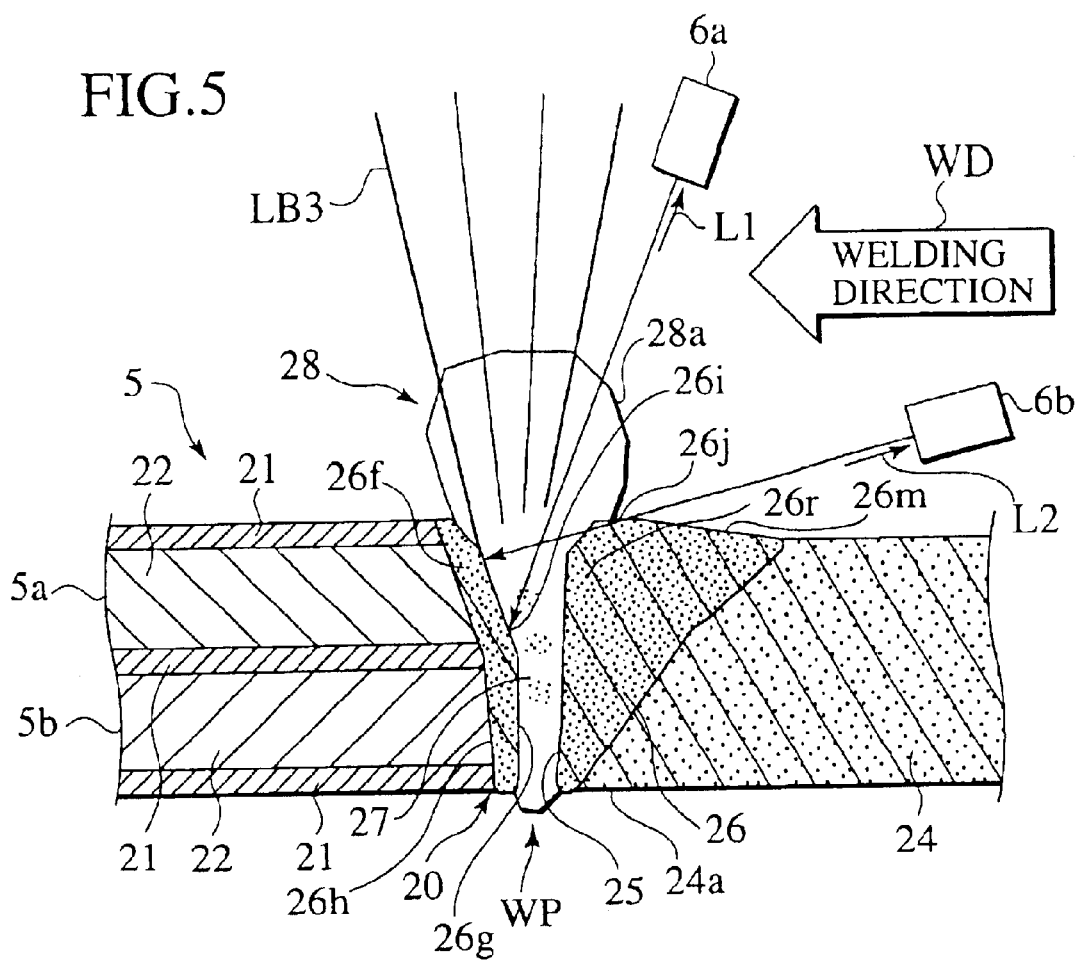
FIG. 5 is a sectional view of a lap welding part of work.
Figure 6:
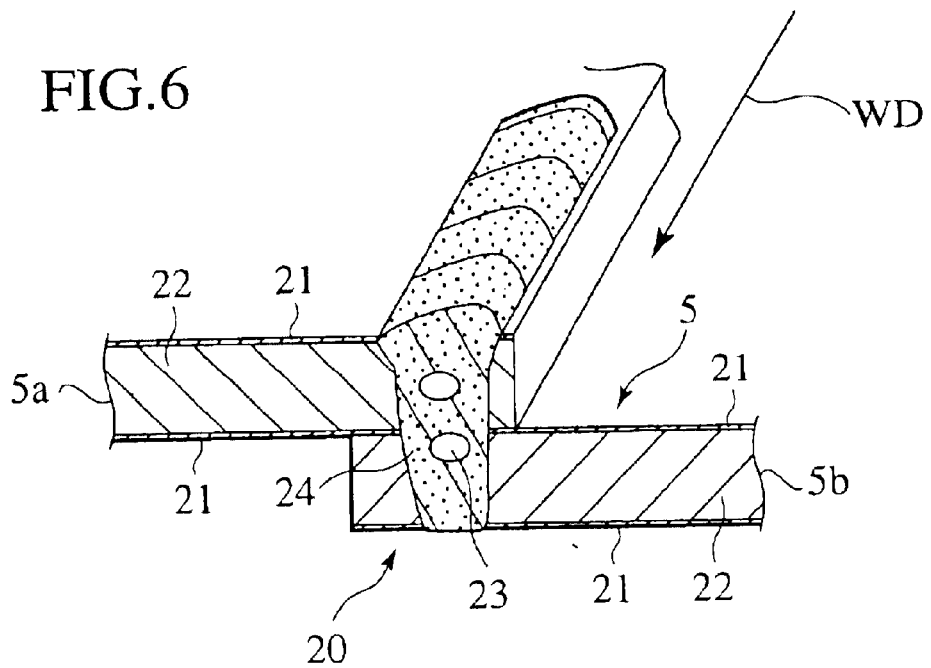
FIG. 6 is a perspective sectional view of a porous weld of a lapped portion of work.
Figure 7:
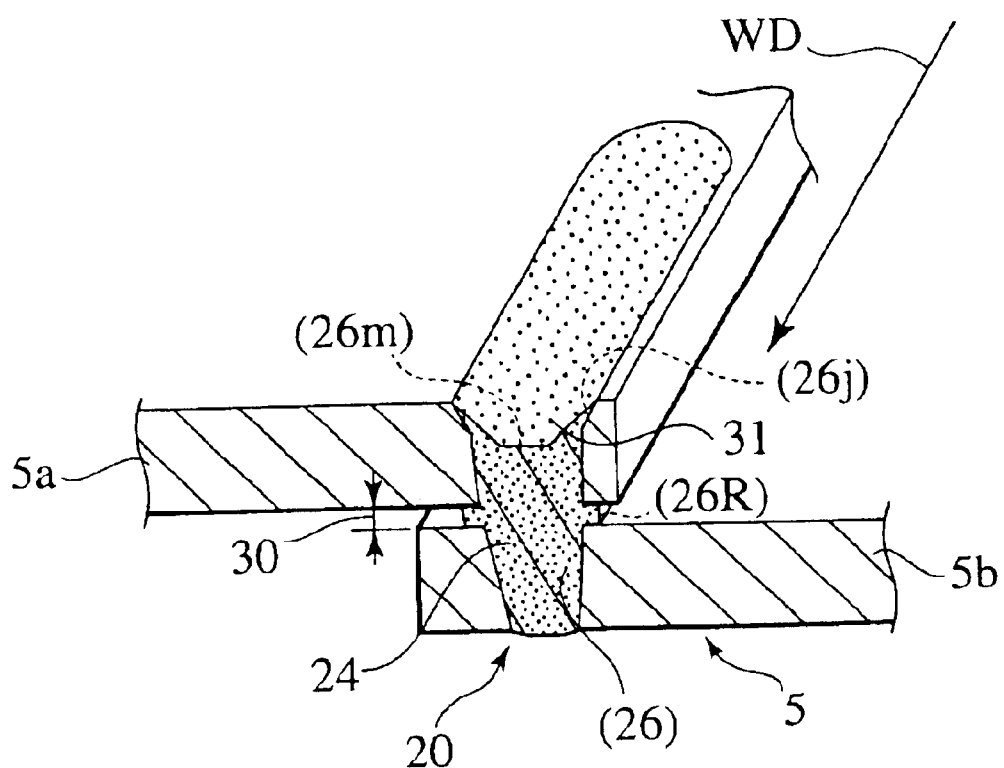
FIG. 7 is a perspective sectional view of an under-filled weld of a lapped portion of work.

FIG. 5 describes why the quality of lap weld 24 at a welding part WP of work 5 is predictable by analysis of light L1, L2 from the welding part WP. FIG. 6 illustrates a porous state of re-solidified lap weld 24 of the work 5, and FIG. 7 illustrates an under-filled state of re-solidified lap weld 24 of the work 5. It is noted that FIG. 5 is a section along a welding direction WD of work 5, and FIGS. 6 and 7 are perspective sectional views. In this embodiment, the work 5 is supposed as a lapped combination of two vehicle body panel members 5a, 5b, that is, a pair of steel sheets 22, 22 each respectively formed with Zn (zinc) layers 21, 21 plated on both sides thereof.

In FIG. 5, as a converged high-power density laser beam LB3 from the YAG laser welder 100 is radiated on a welding part WP of a lapped portion 20 of the work 5, the irradiated welding part WP is caused to melt, by energy transmitted thereto from the laser beam LB3, so that, at a leading or front end 24a of a bead section of re-solidified lap weld 24, a melt region 26 has a (substantially semi-spherical, parabolic, or columnar) keyhole 25 formed therethrough by a plume 28 of high-pressure high-temperature metal (Fe) plasma developed therethrough. The Zn layers 21 plated on the steel sheet 22 as a base material have a far lower melting point than the steel sheet 22, and are vaporized when the steel sheets 22 melt, so that vaporized Zn (confined under pressure) between the lapped sheets 22 may burst forth, in the form of Zn vapor jets 27, through a (substantially quadrisect-spheroidal, half-paraboloidal, or half-tubular) melting front periphery 26f of the melt region 26, into the plume 28 and a (substantially quadrisect-spheroidal, half-paraboloidal, or half-tubular) solidification-starting rear periphery 26r of the melt region 26, causing the melt region 26 to vibrate. As a result, the lap weld 24 may have a porous state 23 with non-conforming traces of Zn vapor jets 27 left in the rear periphery 26r, such as significant pores (blowholes), when this periphery 26 is re-solidified, as illustrated in FIG. 6.

It is noted that, as will be discussed later with reference to FIG. 26, the melt region 26 exposed to the plume 28 is forced to vibrate, depending on variations of plasma pressure, as well as on how and when Zn vapor bursts. It also is noted that, as the welding part WP advances in the welding direction WD, the (melting) front periphery 26f of a current melt region 26 constitutes the (solidification-starting) rear periphery 26r of a subsequent melt region 26 and, as used herein, "re-solidification of a melt region 26" (to be observed within a significant time period) actually means or includes "solidification at a boundary of a rear periphery 26r of the melt region 26" (to be observed within a shorter time period).

The beam LB3 of YAG laser has a wavelength about 1.06 μm, which is short so that YAG laser rays are substantially transmitted through the plume 28 (i.e. with little reflection on or in the plume 28 which is transparent to the laser rays), thus striking on an inside 26g of the front periphery 26f of vibrating melt region 26, where they are partially absorbed, thereby supplying thermal energy to the vicinity of an outside 26h of the front periphery 26f as a melting frontier of the bead section 24, and the rest of laser beam (as well as part of radiation of the plume 28) is reflected at the inside 26g of the front periphery 26f. As the inside 26g is vibrated in a complicated manner, the flux of light reflected therefrom also has a varying density. This density can be detected as a varying intensity of light observed at a fixed angle, which intensity can be processed by way of a spectral analysis to obtain significant data on a current state of the melt region 26, that is substantially associated with a. state of re-solidified weld to be predicted for use in decision on a quality of the weld.

As the weld quality now in concern is a porosity of a bead section of the weld 24 (FIG. 6), the data to be obtained will be most significant, when the varying intensity of light is observed at an observation angle that looks the mid of keyhole 25, or more preferably, at such an observation angle that looks a wall part 26$i$ at the inside 26$g$ of the front periphery 26$f$ of melt region 26 corresponding in vertical position to the plated Zn layer 21 between the steel sheets 22 of work 5. Accordingly, the first sensor 6$a$ employed for use in decision on a porous state of weld 24 is set at a higher or greater angle of elevation ($\theta$1) than the elevation angle ($\theta$2) of the second sensor 6$b$. The elevation ($\theta$1) of the first sensor 6$a$ may preferably be set within an angle range of 45 degrees to 70 degrees, where reflection representing variations in motion of the front periphery 26$f$ of melt region 26 can be caught without interference with radiation of the laser beam LB3 focused on the welding part WP. More preferably, it ($\theta$1) may be optimally set at an angle about 60 degrees, with considerations taken of associated welding conditions such as sheet thickness, inter-sheet gap, laser beam's power and focal point. it is noted that the second sensor 6$b$, which is set lower in elevation than the first sensor 6$a$, looks a top 26$j$ of the melt region 26 and an upper part 28$a$ of the transparent plume 28 developed thereabove, and that this sensor 6$b$ is unable to catch such vibrations of melt that are so fast and unique (to the melt part 26$i$) as to be responsible for the decision of a significant porous state 23 to occur or not when re-solidified.

FIG. 7 shows an under-filled state 31 of weld 24, in which the pair of panel members 5$a$, 5$b$ of Zn-plated steel sheet work 5 have therebetween a lap-welded portion 20 with a greater inter-sheet distance or gap 30 (looser contact) than required for conformity, where part (26$k$) of the melt region (26 under the condition of FIG. 5) was filled, causing a surface (26$m$) of the melt region (26) to be over-recessed, after which the melt region (26) has been re-solidified, providing the weld 24. Such an under-filled state 31 of weld 24 is preferably predictable by spectral analysis of light detected at the second sensor 6$b$.

Figure 8:
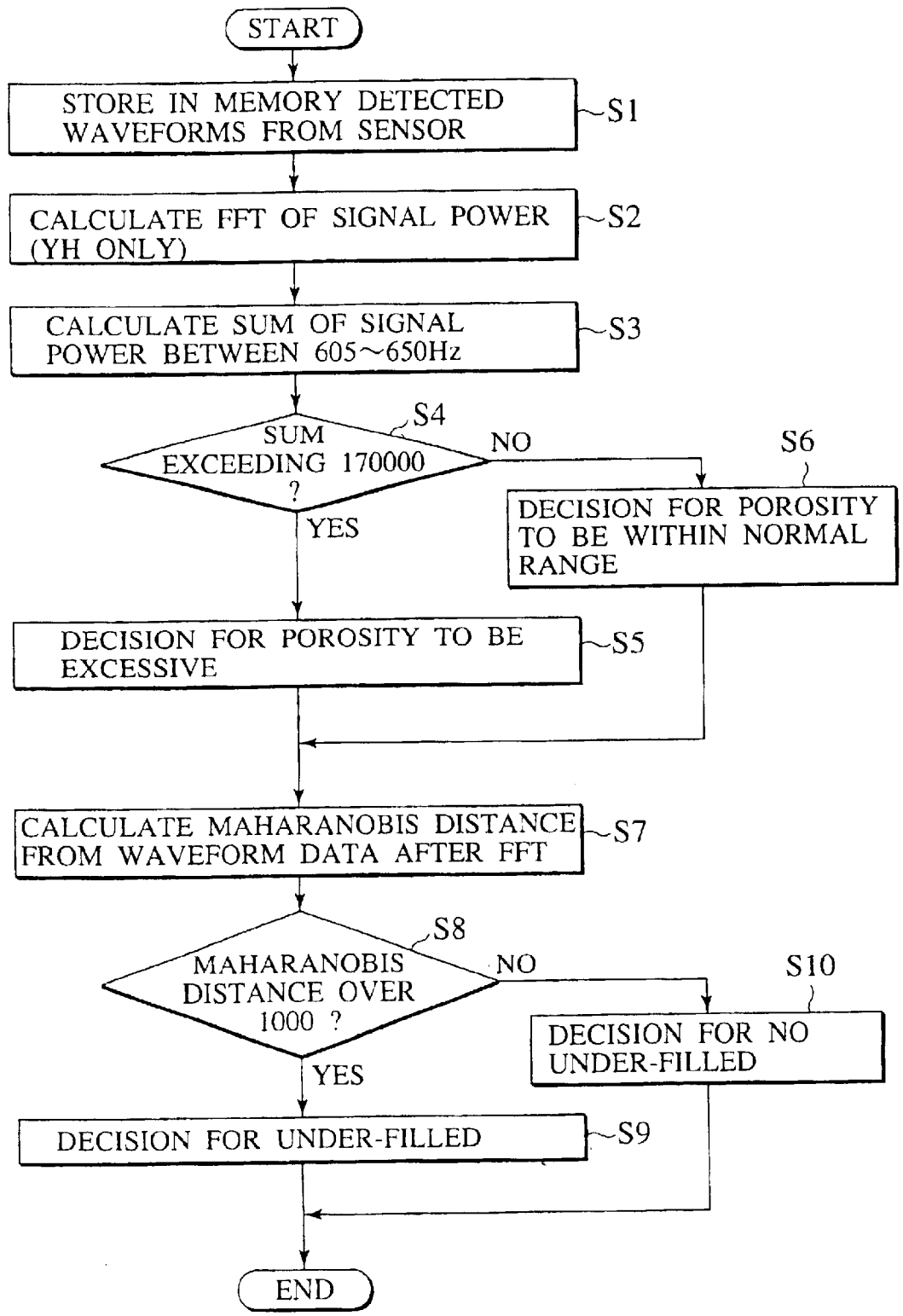
FIG. 8 is a flowchart of processes for monitoring a quality of weld to be free of significant porous or under-filled state.

FIG. 8 is a flowchart of processes (in the computer 7$e$) for monitoring a quality of lap-weld (to be free of significant porous or under-filled state) in accordance with an embodiment of the invention. FIG. 9 to FIG. 12 illustrate data obtained for spectral analyses of light detected by the first and second sensors 6$a$, 6$b$ under the following reference welding conditions; YAG laser output, 3 kw at the welding part WP; panel members 5$a$, 5$b$, Zn-plated steel sheets 0.8 mm thick each, and welding speed, 4.5 m/min.

As the YAG laser beam LB3 is irradiated to a frontier of the welding part WP in the lapped portion 20 of the panel members 5$a$, 5$b$ as Zn-plated steel sheets, the frontier of the welding part WP is melt with thermal energy of the laser beam LB3, so that the welding pan WP has a melt region 26 with a keyhole 25, which (25) is formed by a plume 28 developed therethrough and defined by the combination of a front periphery 26$f$ as a melting part of the melt region 26 and a rear periphery 26$r$ as a part of the melt region 26 to be re-solidified The plume 28 and wall of the keyhole 25 (as a combination of the front periphery 26$f$ and a front part of the rear periphery 25$r$) are very hot, and radiate visible rays of light and infrared rays, which are detected by the first and second sensors 6$a$ and 6$b$ (FIG. 1) of the weld quality monitoring system QMS, together with such rays of laser beam LB3 that are reflected from the wall of keyhole 25.

In the monitoring system QMS, those rays of light detected by the first and second sensors 6$a$ and 6$b$, i.e., optical signals L1 (at the sensor 6$a$) and L2 (at the sensor 6$b$) enter the diffraction systems DS1 and DS2 (FIG. 3) in the sensors 6$a$ and 6$b$, where they are diffracted into four optical analog detection signals L11 (YAG laser light 1.06 $\mu$m, in L1), L12 (visible light under 500 nm, in L1) and L21 (YAG laser light 1.06 $\mu$m, in L2), L22 (visible light under 500 nm, in L2), which are processed by the signal processing lines PL (PL1$a$, PL1$a$, PL1$b$ and PL2$a$, PL2$b$) (FIG. 4) to provide four sets of electrical digital detection signals Eb, Ed to be processed in the computer 7$e$ of the quality monitor QM for monitoring qualities of re-solidified weld 24 (FIG. 6, FIG. 7) at the current welding part WP (FIG. 5) by way of prediction. In the signal processing lines PL (FIG. 4), the optical detection signals L11, L12 and L21, L22 strike on the photo-diodes 8$a$, 9$a$ and 8$b$, 9$b$ of the sensors 6$a$ and 6$b$, respectively, where they are converted into four electrical analog detection signals E11, E12 and E21, E22 (FIG. 3), which are input to the measuring circuits MC (71$a$, 71$b$ and 72$a$, 72$b$) (FIG. 2), where they are amplified by corresponding amplifiers 7$a$ (FIG. 4), then amplified detection signals Ea are processed, on the one hand, by four processing circuits 73 respectively including A/D converters 7$b$ to provide a group of four digital detection signals Eb (whole spectral components), and on the other hand, by four processing circuits 74 respectively including band-pass filters 7$c$ and A/D converters 7$d$ to provide another group of four digital detection signals Ed (exclusive spectral components).

At a step S1 (FIG. 8), four sets of thus obtained signals Eb, Ed are sampled in order by the computer 7$e$, and stored in the memory 7$g$, as four sets of digital data on respective waveforms of analog detection signals L11, L12 and L21, L22 (or E11, E12 and E21, E22), which represent varying intensities (as densities of flux) of such diffracted components of detected light L1 and L2 that reside in wavelength bands (<500 nm; –1.06 $\mu$m) defined by combination of dichroic mirror 10 and interference filter 11 (FIG. 3). It is noted that, among a total of eight types of digital signals Eb (for L11, L12 and L21, L22) and Ed (for L11, L12 and L21, L22), selected one (for example, Ed for L11) or more may preferably have a priority (or priorities) to be sampled, as necessary for monitoring a concerned quality (for example, absence of significant porosity) or in consideration of an available memory capacity.

Figure 9:
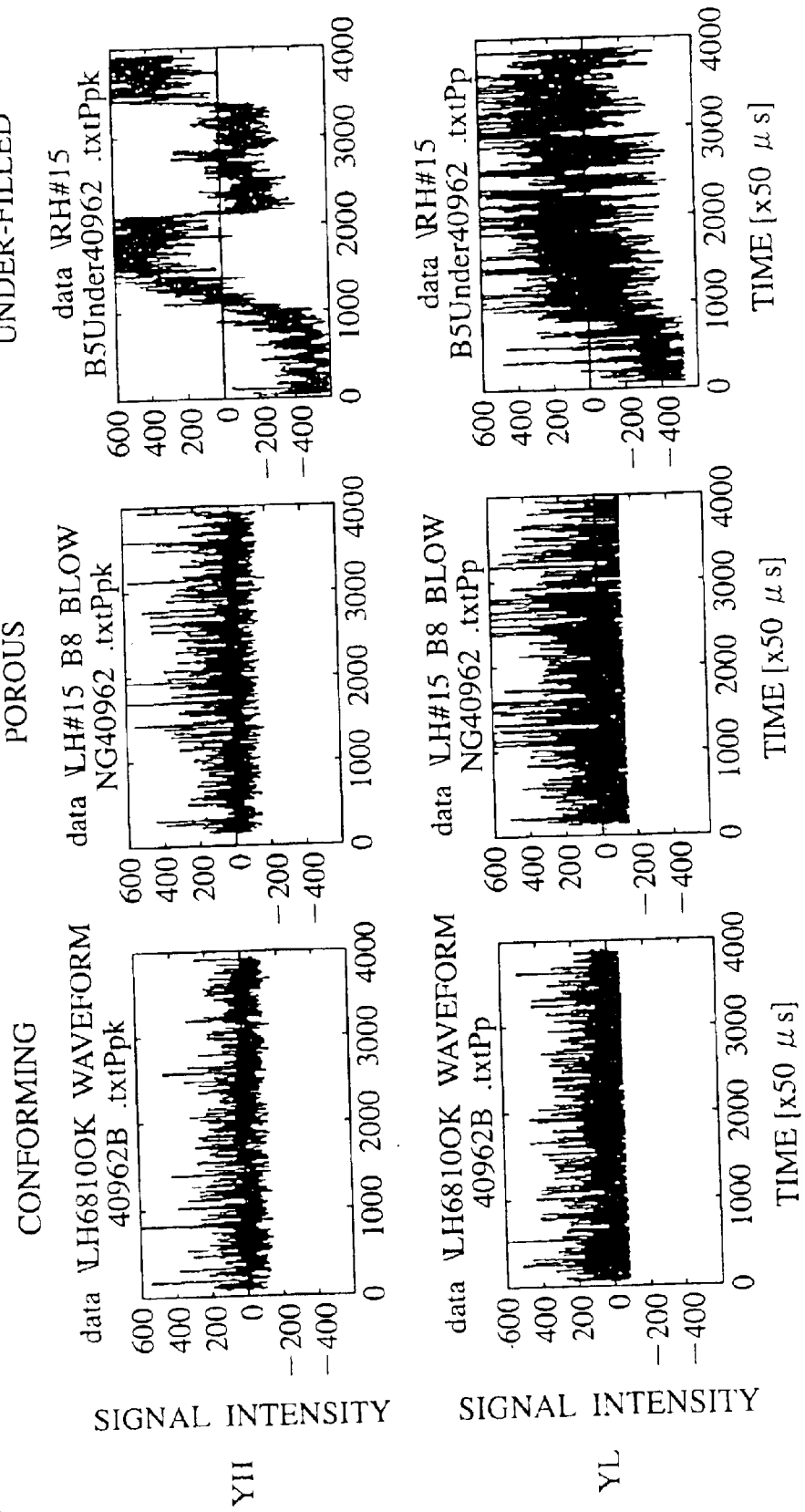
FIG. 9 is a set of waveform graphs of data on intensities of filtered infrared rays of light from a welding part observed by a pair of P-E converting sensors under reference welding conditions.

FIG. 9 is a set of waveform graphs (by .txtPpk or .txtPp) of stored data (item nos. 40962B and 40962) on intensities of filtered infrared rays of light from the welding part WP, i.e., on electrical detection signals (Eb for L11 and L21) obtained from reflection substantially of YAG laser beam LB3 (at the wall part 26$i$ in keyhole 25 and the top 26$j$ of melt region 26, and though a little, radiation from the plume 28 and melt region 26) under the above-noted reference welding conditions (for beads of article), as the data are sampled in the computer 7$e$ at a sampling frequency of 20 kHz. In the waveform graphs, the ordinate and abscissa represent a signal intensity (amplitude) and a lapse time, respectively, and reference characters YH and YL denote data on temporal variations of infrared reflection intensities caught by the first sensor 6$a$ high of observation angle and the second sensor 6$b$ low of observation angle, respectively. In FIG. 9, shown by graphs at the left are data of a bead section (LH6810) with a conforming quality of weld (OK WAVEFORM), central ones are data of a bead section (LH#15) with a significant porous state (B8 BLOW NG), and right ones are data of a bead section (RH#15) with an under-filled state (B5 Under). In the case of under-filled bead section, its YH and YL waveforms are apparently different from those of conforming bead section, so that the decision for an under-filled state can be easily made. However, in the case of porous bead section, of which YH and YL waveforms appear little different from those of conforming bead section, it is difficult for a simple comparison of the former with the latter to give an ensured decision for the former to be porous.

Figure 10:
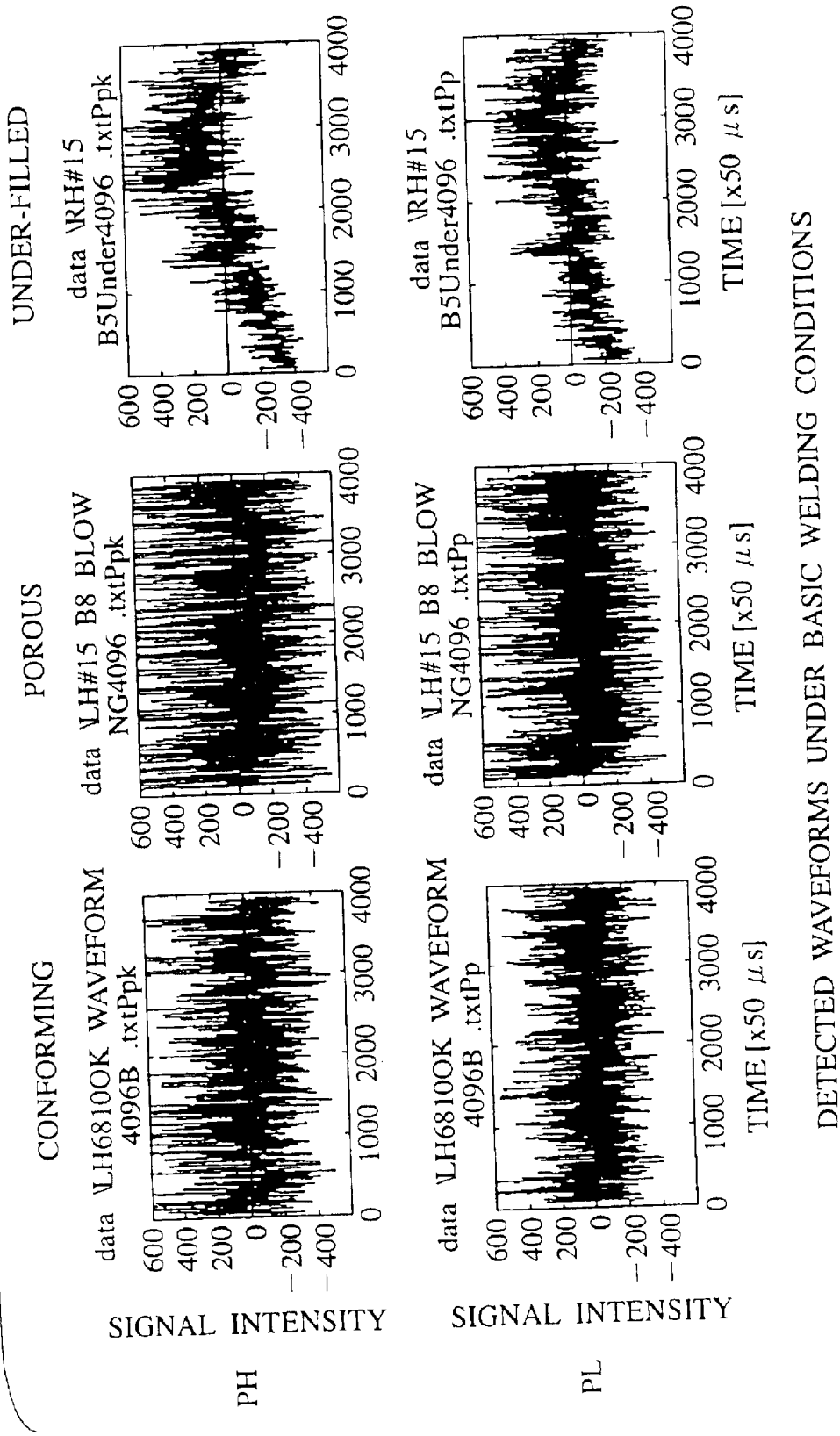
FIG. 10 is a set of waveform graphs of data on intensities of visible rays of light from the welding part observed by the pair of sensors under the reference welding conditions.

FIG. 10 is a set of waveform graphs (by .txtPpk or .txtPp) of stored data (item nos. 4096B and 4096) on intensities of visible rays of light from the welding part WP, i.e., on electrical detection signals (Eb for L12 and L22) obtained from radiation substantially from the plume 28 and melt region 26 (and though a little, reflection at the wall part 26i in keyhole 25 and the top 26j of melt region 26) under the above-noted reference welding conditions (for the beads of article), as the data are sampled in the computer 7e at a sampling frequency of 20 kHz. In these waveform graphs, the ordinate and abscissa represent a signal intensity (amplitude) and a lapse time, respectively, as described, but reference characters PH and PL denote data on temporal variations of visible radiation intensities caught by the first sensor 6a high of observation angle and the second sensor 6b low of observation angle, respectively. In FIG. 9, shown by graphs at the left are data of the bead section (LH6810) with a conforming quality of weld (OK WAVEFORM), central ones are data of the bead section (LH#15) with a significant porous state (B8 BLOW NG), and right ones are data of the bead section (RH#15) with an under-filled state (B5 Under). In the case of under-filled bead section, its PH and PL waveforms are apparently different from those of conforming bead section, so that the decision for an under-filled state can be easily made. However, in the case of porous bead section, of which PH and PL waveforms appear little different from those of conforming bead section, it is difficult for a simple comparison of the former with the latter to give an ensured decision for the former to be porous.

Like this, it is difficult for a simple examination of temporal intensity variations of reflected light and visible light detected by the sensors 6a and 6b to conclude a distinction between conforming bead section and porous bead section. Therefore, at a step S2 of the flowchart of FIG. 8, among waveform data stored in the memory 7g, data on YH waveforms (Eb for L11 of 40962B and 40962) as temporal variations of infrared reflection caught by the first sensor 6a high of observation angle are read in the computer 7e, where they are processed by a programmed operator for calculating an FFT (high-speed Fourrier transform) of their signal intensities to provide frequency characteristics of the YH waveforms, each as a spectral distribution of signal power over a specified frequency range (0 to 2000×50 Hz).

Figure 11:
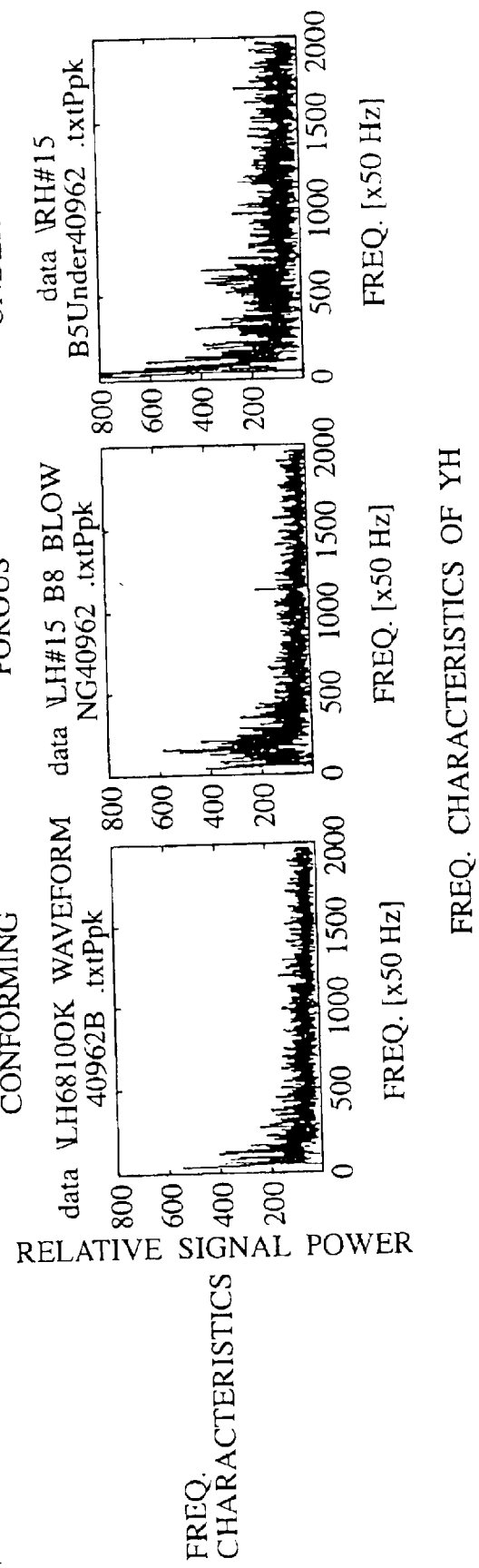
FIG. 11 is a set of waveform graphs of spectral power distributions of infrared components of light detected by one sensor high of observation angle.

FIG. 11 shows a set of power distribution waveform graphs of thus obtained data (FFT of YH). In the waveform graphs, the ordinate and abscissa represent a level of relative signal power and a frequency, respectively. The relative signal power (sometimes simply called "signal power", as used herein) is a dimensionless index indicating how much the integration of power of signal components amounts within an associated quantization slot of frequency. As will be apparent from comparison between left and central graphs of FIG. 11, the FFT operation of signal intensity provides a distribution of relative signal power which has a significant difference even between conforming bead section (LH6810) and porous bead section (LH#15). More specifically, the power distribution of conforming bead section bas significant peaks of relative signal power within a frequency range of 100 Hz to 500 Hz, while that of porous bead section has significant peaks of relative signal power within a frequency range of 0 Hz to 1000 Hz. In this embodiment, such a difference of power distribution is evaluated for the weld quality monitoring to be ensured, in the following manner.

At a step S3 of the flowchart of FIG. 8, there is calculated, for a respective bead section of weld in concern, a sum of signal power of components within a range between 605 Hz and 650 Hz by using waveform data after the FFT transform of signal intensities. Then, at a step S4, a decision is made of whether or not the above-noted sum exceeds a reference value 170,000. If the sum exceeds the reference value (YES), the control flow goes to a step S5, where a decision is made for the porosity to be excessive (in the sense of significance). Unless it exceeds the reference value (NO), the control flow goes to a step S6, where a decision is made for the porosity to be within a normal range. The result of such a decision is indicated on the display 7f.

It is noted that, for calculation of the relative signal power as a dimensionless index ($x_{ijk}$) for an i-th one of I frequency bands, for a j-th one of J bead sections of weld, and for a k-th one of K observed articles, where "I", "J", and "K" are specified integers, and "i", "j", and "k" are arbitrary integers not exceeding I, J, and K, respectively, the FFT operator has once determined or is given a combination of data on a standard average vector $\{m_{jk}; k=0\}$, a standard deviation vector $\{\sigma_{jk}; k=0\}$, and a standard data vector $\{x_{ijk}; k=0\}$ as a set of I normalized indices $x_{ij0}$ of signal power, for a respective one of J conforming bead sections of weld of a reference article (article no. k=0), so that the index ($x_{ijk}$) can be determined as a normalized dimensionless value, such that $x_{ijk}=(y_{ijk}-m_{j0})/o_{j0}$, where $y_{ijk}$ is a level of absolute signal power at an i-th frequency band of a waveform of a j-th bead section of a k-th observed article. Further, for the j-th bead section of the k-th observed article, a set $\{x_{ijk}\}$ of associated dimensionless indices $x_{ijk}$, is processed together with a corresponding set $\{x_{ij0}\}$ of standard data $x_{ij0}$ to determine an (m×m) correlation matrix $R(r_{mm})$ therebetween and an (m×m) inverse matrix $A(a_{mm})$ of the correlation matrix $R(r_{mm})$, where "m" is an integer equivalent to I. The reference bead section may preferably be a conforming one of observed bead sections, so that data of this bead section can be conveniently re-used.

Figure 12:
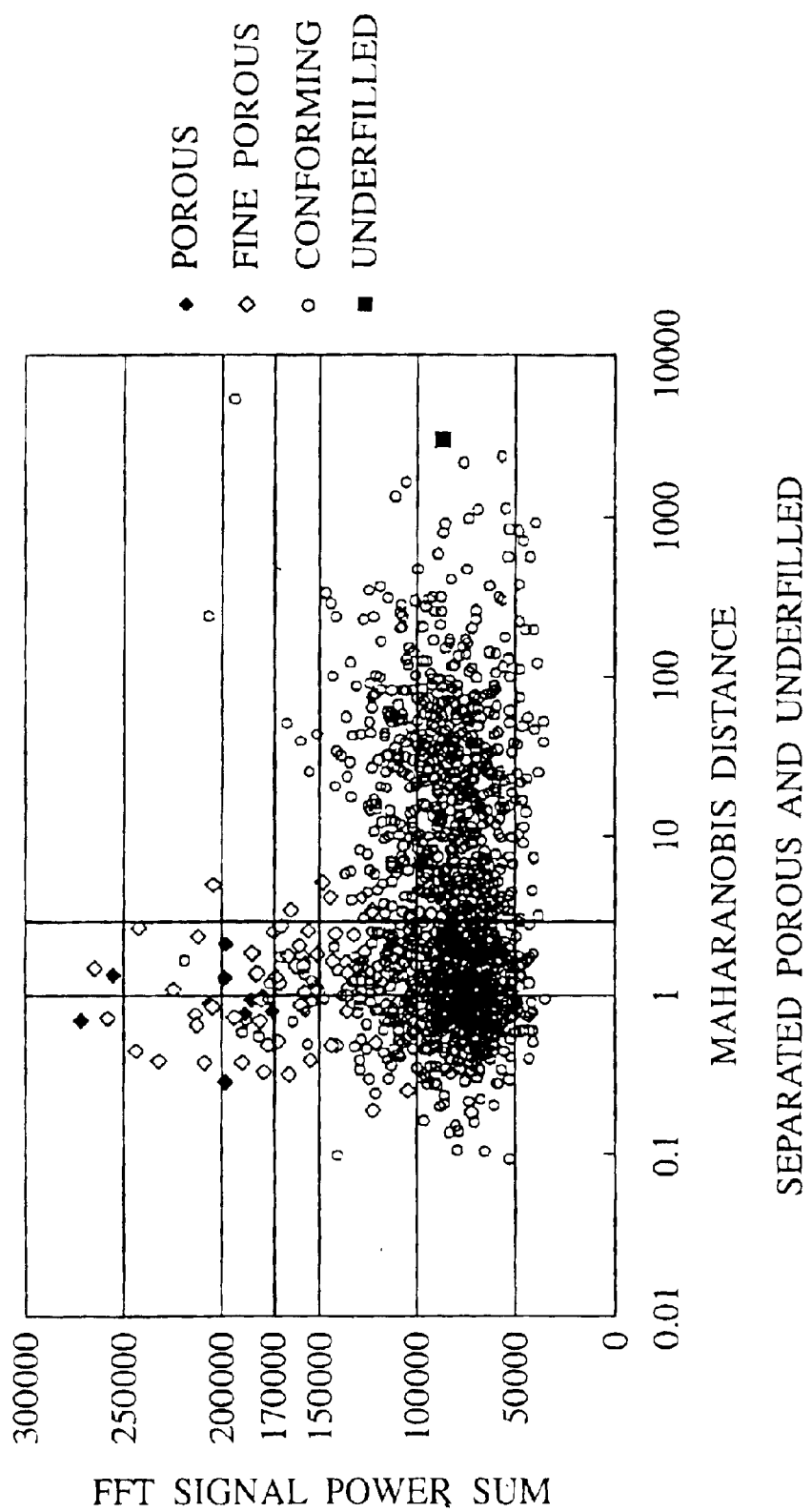
FIG. 12 is a graph showing typical distributions of Marharanobis distances over a range of signal power for porous, fine porous, conforming, and under-filled parts.

Next, at a step S7, on the basis of dimensionless index set $\{x_{ijk}\}$ and inverse matrix $A(a_{mn})$ for j-th bead section of k-th observed article, there is calculated a corresponding value of a standardized dispersion in terms of a Maharanobis distance $D_{jk}$, such that $D_{jk}^2=[\{x_{ijk}\}][A(a_{mn})][\{x_{ijk}\}]^1$ (e.g. for a j of k corresponding to any of item nos. 40962B and 40962) by processing a corresponding set of resultant data of the FFT operation, that is, a data set of characteristic quantities as levels of relative signal power of a spectral waveform in FIG. 11. The Maharanobis distance in terms of $D_{kj}$ or $D_{kj}^2$ is an algebraic distance representing how far a set of characteristic quantity of the FFT signal power waveform at a current welding part of a bead section under observation (e.g. 40962) is spaced from that of the reference bead section, in a vector filed normalized relative to the set of characteristic quantities of signal power waveform of the reference bead section. FIG. 12 is a graph of which ordinate and abscissa represent the sum of FFT signal power and the Marharanobis distance in logarithmic representation, and on which four typical sets of Maharanobis distances (at corresponding welding parts of porous, fine porous, conforming, and under-filled bead sections) are mapped to show their distributions that depend on respective sets of characteristic quantities of associated signal power waveforms.

At a step S8 of the flowchart of FIG. 8, there is made a decision based on such a distribution of Maharanobis distances, as to whether or not the bead Section under observation has at the current welding part a Maharanobis distance exceeding a threshold or reference value 1000. If the Maharanobis distance is in excess (YES), the control flow goes to a step S9, where a decision is made for an under-filled stale to occur. Unless it is so, the flow goes to a step S10, where as decision is made for no under-filled state to occur.

In the embodiment described, as to whether or not the porosity is excessive, there is made a decision in dependence on the sum of signal power within a particular frequency range. It however is noted that, as will be seen from the distribution in FIG. 12, Maharanobis distances of porous bead section reside within a region defined by combination of a range of Maharanobis distance under 2 and a range of signal power sum over 170000, the decision as to whether or not the porosity is excessive may preferably be made, on basis of a set of characteristic quantities of a signal power waveform of FIG. 11 resulted from the FFT operation of signal intensities, by calculating an associated Maharanobis distance and signal power sum within a particular frequency band to know which region this combination of distance and sum belongs to, like the case of a decision to be made for an under-filled state to occur.

Moreover, this embodiment is described of the case of welding conditions on sheet thickness to be 0.8 mm and welding speed to be 4.5 m/min. It will be understood that a weld quality monitoring method or system according to this invention is applicable also to welding speed and/or sheet thickness else than described. In the case of welding conditions different from above in welding speed and/or sheet thickness, the particular frequency band associated with the decision for a porous state to occur may preferably be varied, This is because, along with variation of welding speed and/or sheet thickness, the particular frequency band to be effective for decision of porous state varies. In order for the decision of porous state to have a maintained accuracy, an optimal frequency band therefor is selected, as it varies in dependence on welding speed and/or sheet thickness.

In order to keep the decision of porous state always accurate, it was examined how the particular frequency band should be changed in consideration of varied welding speed and/or sheet thickness, in an experimental manner, as follows: As work, two Zn-plated steel sheets 0.8 mm and 1.0 mm thick were lapped to be welded. Welding speed was varied between 3.0 m/min to 5.0 m/min YAG laser power was set to 3 kW at the welding part.

Figure 13:
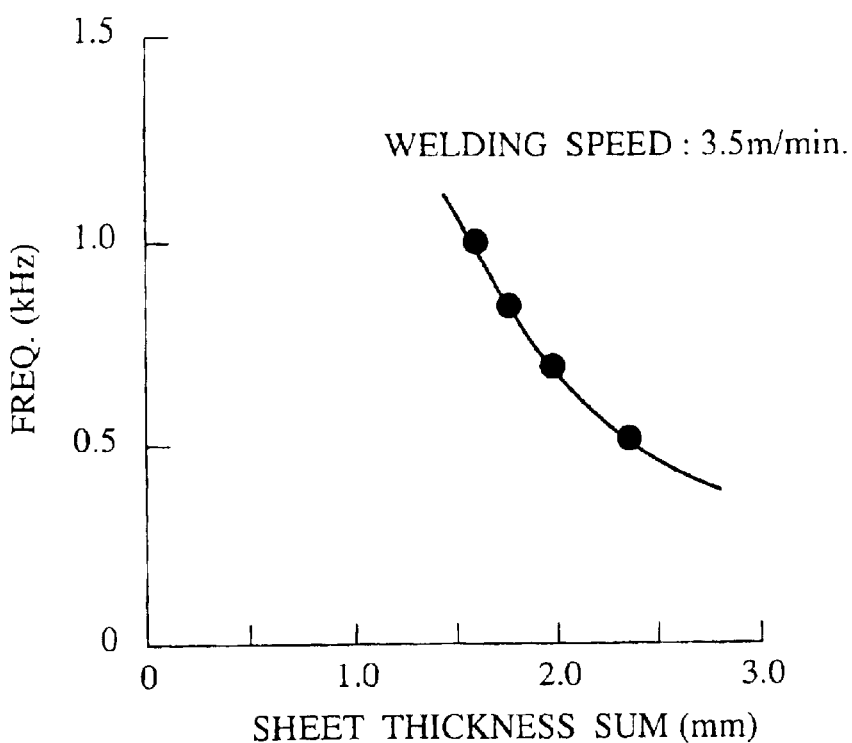
FIG. 13 is a graph showing a relationship between a sheet thickness sum and a frequency to be effective for a decision of porous state.

Description is now made of a case in which the sheet thickness was changed. In this experiment, welding speed was set to 3.5 m/min, while the two sheets had a sum of thickness thereof (as a nominal, i.e., assuming no inter-sheet gap) changed between 1.6 mm to 2.4 mm. In case of a sheet thickness sum of 2.4 mm, for example, an occurrence of porous state accompanied a tendency for the signal power to rise within a frequency band of 0 Hz to 50 Hz. As the sheet thickness sum decreased, the signal power tended to rise within an enlarged frequency band. FIG. 13 shows a result of this experiment.

As shown in FIG. 13, the signal power rose high in a frequency band of 0 Hz to 1,000 Hz for a sheet thickness sum of 1.6 mm, a frequency band of 0 Hz to 800 Hz for a sheet thickness sum of 1.8 mm, a frequency band of 0 Hz to 700 Hz for a sheet thickness sum of 2.0 mm, and a frequency band of 0 Hz to 500 Hz for a sheet thickness sum of 2.4 mm. Accordingly, for a decision of porous state, depending on what mm the sheet thickness sum is, it is determined which frequency band to be selected. It is noted that the quality monitor QM of measuring system MS (FIG. 4) has stored in the memory 7g such a relationship between sheet thickness sum and frequency as shown in FIG. 13.

Figure 14:
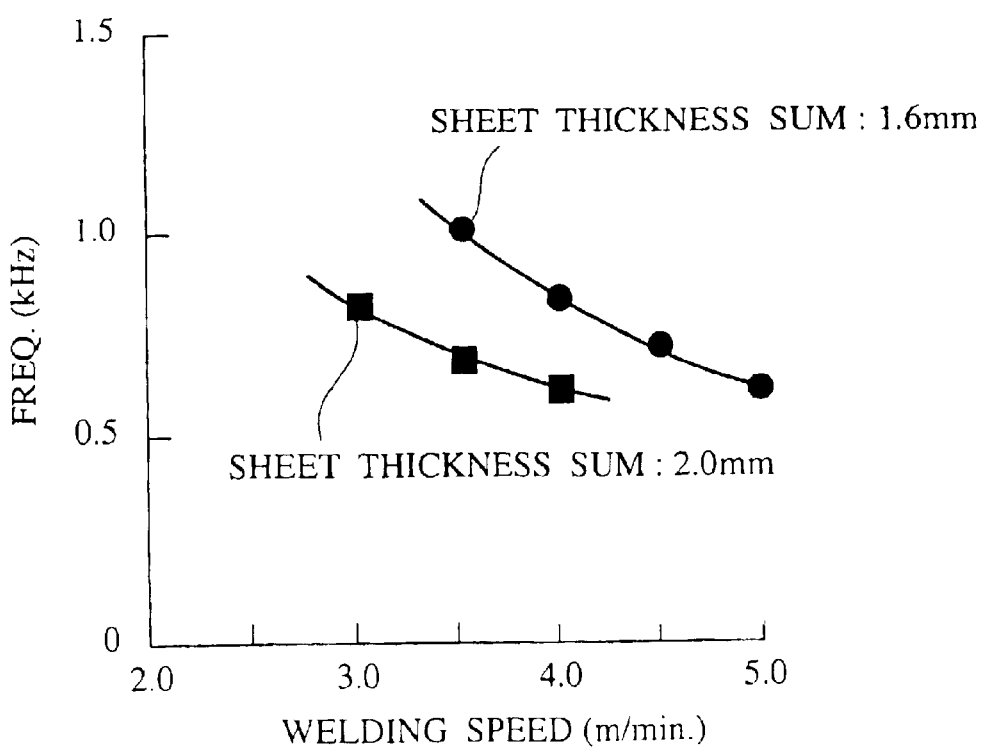
FIG. 14 is a graph showing a relationship between a welding speed and a frequency to be effective for a decision of porous state, for different sheet thickness sums.

Description is now made of a case in which the welding speed was changed. In this experiment, the change of welding speed was between 3.5 m/min to 5.0 m/min for a sheet thickness sum of 1.6 mm, and between 3.0 m/min to 5.0 m/min increased, the signal power tended to rise within a narrower frequency band. FIG. 14 shows a result of this experiment.

As shown in FIG. 14, for the sheet thickness sum 1.6 mm, the signal power rose high in a frequency band of 0 Hz to 1000 Hz at a welding speed of 3.5 m/min, a frequency band of 0 Hz to 800 Hz at a welding speed of 4.0 m/min, a frequency band of 0 Hz to 700 Hz at a welding speed of 4.5 m/min, and a frequency band of 0 Hz to 600 Hz at a welding speed of 5.0 m/min.

For the sheet thickness sum 2.0 mm, the signal power rose high in a frequency band of 0 Hz to 800 Hz at a welding speed of 3.0 m/min, a frequency band of 0 Hz to 700 Hz at a welding speed of 3.5 m/min, and a frequency band of 0 Hz to 600 Hz at a welding speed of 4.0 m/min.

Accordingly, for a decision of porous state, depending on what m/min the welding speed is, it is determined which frequency band to be selected. It is noted that the quality monitor QM of measuring system MS (FIG. 4) has stored in the memory 7g such a relationship between sheet thickness sum and frequency as shown in FIG. 13, and such a relationship between welding speed and frequency as shown in FIG. 14 for various sheet thickness sums, as a set of data listed in the form of a Table-1 shown in FIG. 15. The Table-1 has various welding speeds listed in a matrix of addresses defined by combination of a row of different thickness t1 (FIG. 16) of upper sheet 5a and a column of different thickness t2 (FIG. 16) of lower sheet 5b, each for access to a stored frequency to be effective for a decision of porous state. For example, an address of welding speed 3.5 m/min defined by combination of an upper sheet thickness t1 of 1.2 mm and a lower sheet thickness t2 of 0.8 mm leads to a frequency band of 0 Hz to 800 Hz to be effective for use at the welding speed 3.5 m/min for a sheet thickness sum of 2.0 mm, as shown in FIG. 14. Likewise, an address of welding speed 5.0 m/min defined by combination of an upper sheet thickness t1 of 0.8 mm and a lower sheet thickness t2 of 0.8 mm leads to a frequency band of 0 Hz to 600 Hz to be effective for use at the welding speed 5.0 m/min for a sheet thickness sum of 1.6 mm, as shown in FIG. 14.

Like this, the frequency to be effective for a decision of porous state varies in dependence on variations of nominal sheet thickness and welding speed, which may well be associated with a difference in configuration of the melt region 26 or keyhole 25 (FIG. 5) in analysis of weld quality.

Figure 16:
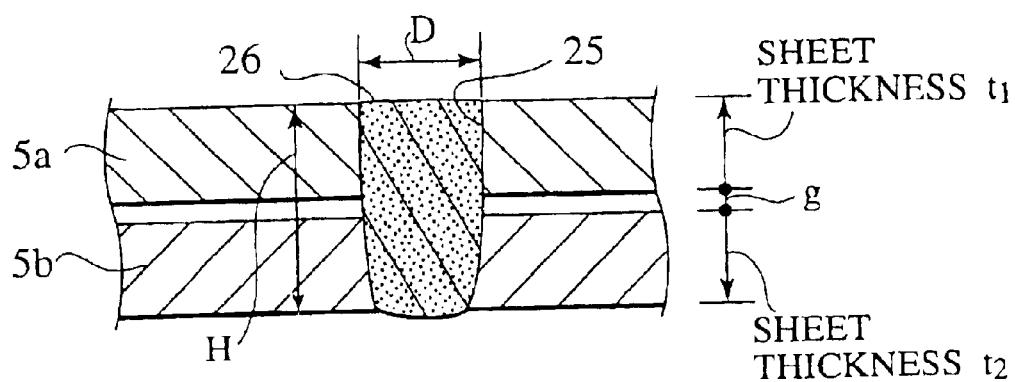
FIG. 16 is a sectional view describing a mechanism of variation of effective frequency band at a welding part.

FIG. 16 describes this mechanism. Upon irradiation of YAG laser beam, lapped sheets 5a, 5b have a melt region 26 with keyhole, of which the configuration varies in dependence on an apparent sheer thickness sum and welding speed, so that it has a greater depth H (i.e. elongated or increased in an aspect ratio H/D relative to its width D), as the sheet thickness sum increases, or has a smaller width D (i.e. elongated either, but decreased in the aspect ratio H/D), as the welding speed increases. It is noted that the apparent sheet thickness sum equals to a sum of t1+t2+g (an inter-sheet gap), i, e., the nominal sheet thickness sum (t1+t2)+ the inter-sheet gap (g). In calculation of the aspect ratio H/D, the depth H equals to the apparent sum. However, for designation of address in Table-1, the nominal sum is used, as the stored data is for a typical welding, where the inter-sheet gap is properly set.

As described with reference to FIG. 13 and FIG. 14, the frequency to be effective for a decision of porous state is lowered, either when the sheet thickness (sum) increases or when the welding speed increases This is partly because of an increased aspect ratio H/D due either to an increased sheet thickness (sum) or an increased welding speed, accompanying a melt region with keyhole to be elongate with a lowered resonance frequency, thus resulting in a reduced frequency band where the signal power tends to rise.

It may thus be preferable to recognize, by use of a CCD camera or the like, a melt region with keyhole as a configuration model to be based on for determination of aspect ratio H/D, to thereby determine an effective frequency for a decision of porous state.

Second Embodiment

There will be described below a weld quality monitoring method and system according to an embodiment of the invention, which allows an ensured decision on a quality of weld that may be under-filled or non-welded, and is different from the first embodiment in which a decision is made for a porous state to occur.

The weld quality monitoring system and an associated welding system in the second embodiment are identical to those (QMS and WS in FIGS. 1 to 4) of the first embodiment, providing that a personal computer 7e is adapted, by programs to be read therein from a memory 7g, for necessary functions to execute various processes described herein, including: in addition to functions in the first embodiment, a function for calculating a value of signal power in a respective one of three frequency bands, that is, a first frequency band for detecting an under-filled state, a second frequency band for detecting a porous state, and a third frequency band for detecting a non-welded state; a function for making a decision for a respective one of a conforming state, an under-filled state, a porous state, and a non-welded state to occur; and a function for dividing (a region covering) a set of data on time-dependant variations of electrical detection signals stored for a respective welding part, into a plurality of (sub-regions covering) subsets thereof in the form of a temporal sequence.

Figure 17:
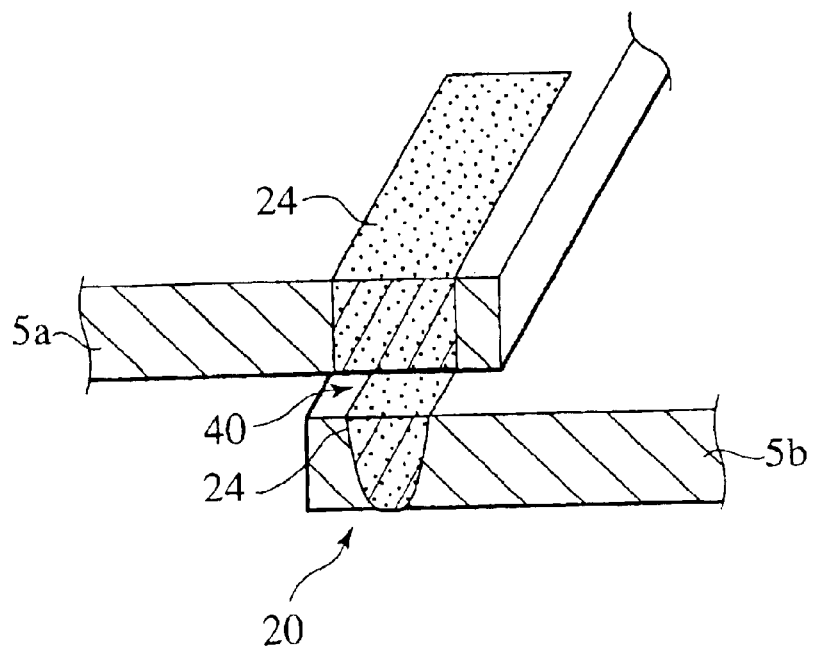
FIG. 17 is a perspective sectional view of a non-welded state of a lapped portion of work.
Figure 18:
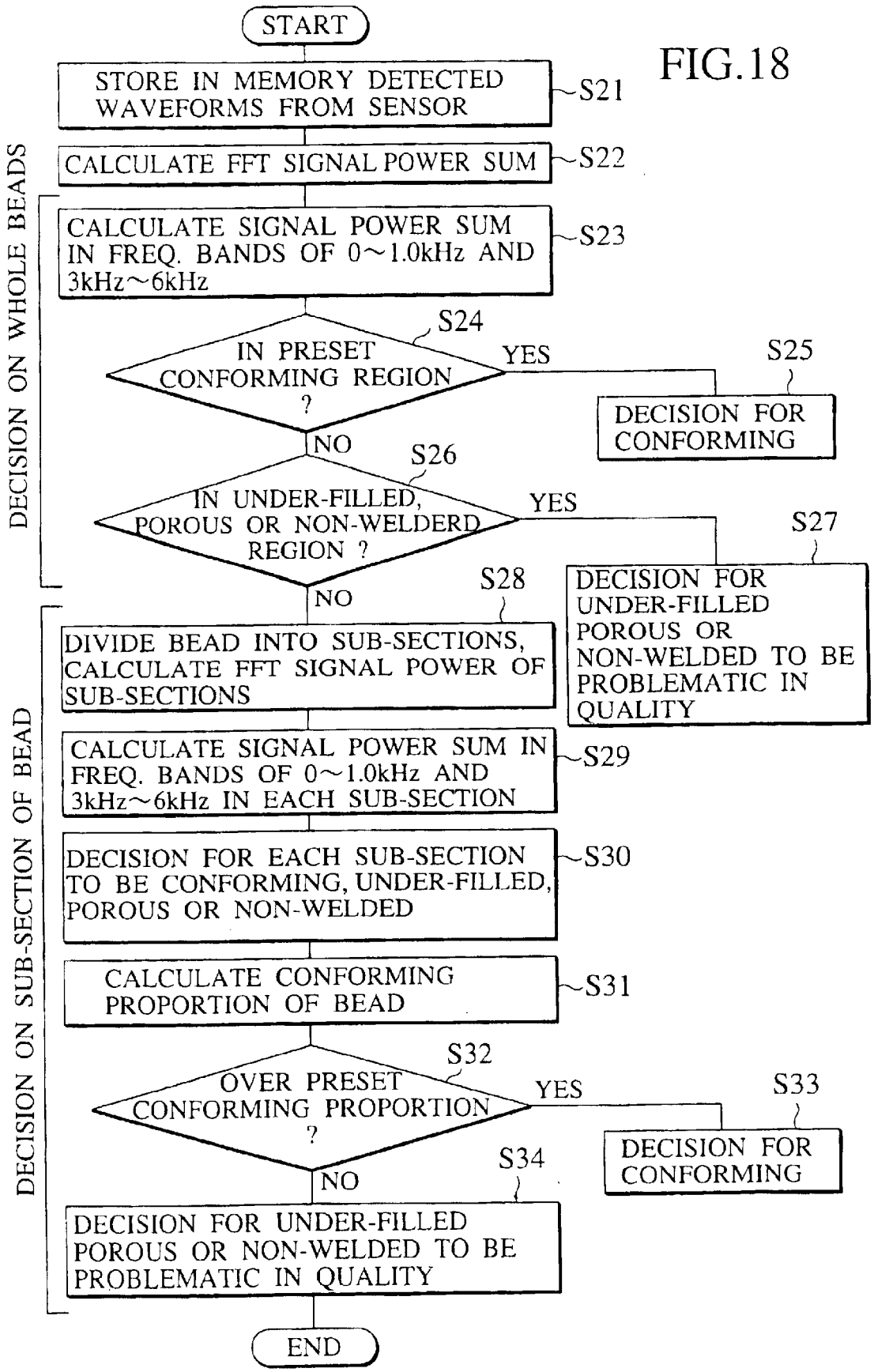
FIG. 18 is a flowchart of processes for monitoring a quality of weld by a weld quality monitoring system according to another embodiment of the invention.
Figure 19:
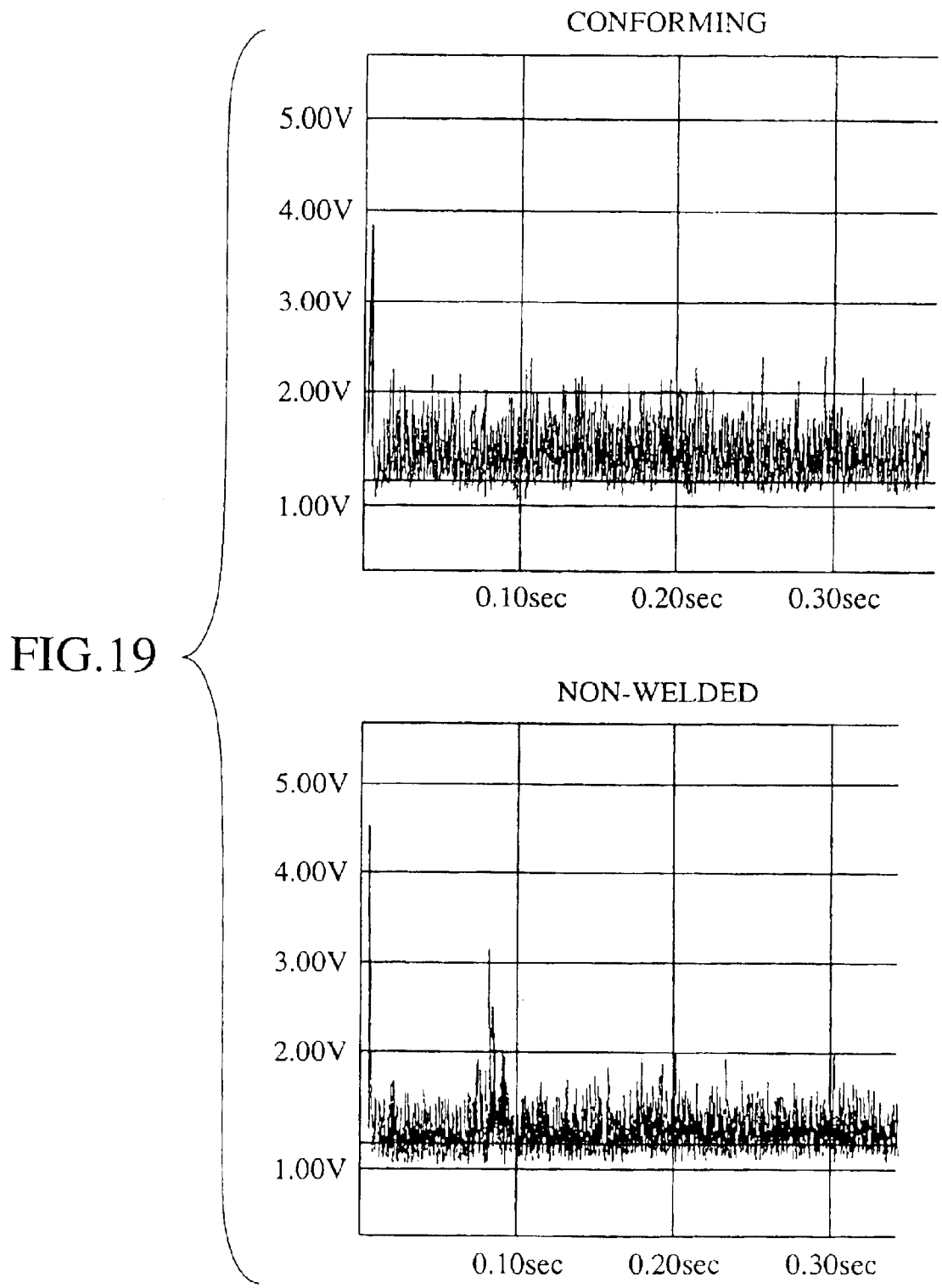
FIG. 19 is a set of waveform graphs each respectively of an electrical detection signal representing varying intensities of infrared rays of reflected light of YAG laser beam in a welding accompanied by a conforming state or a non-welded state under reference welding conditions.
Figure 20:
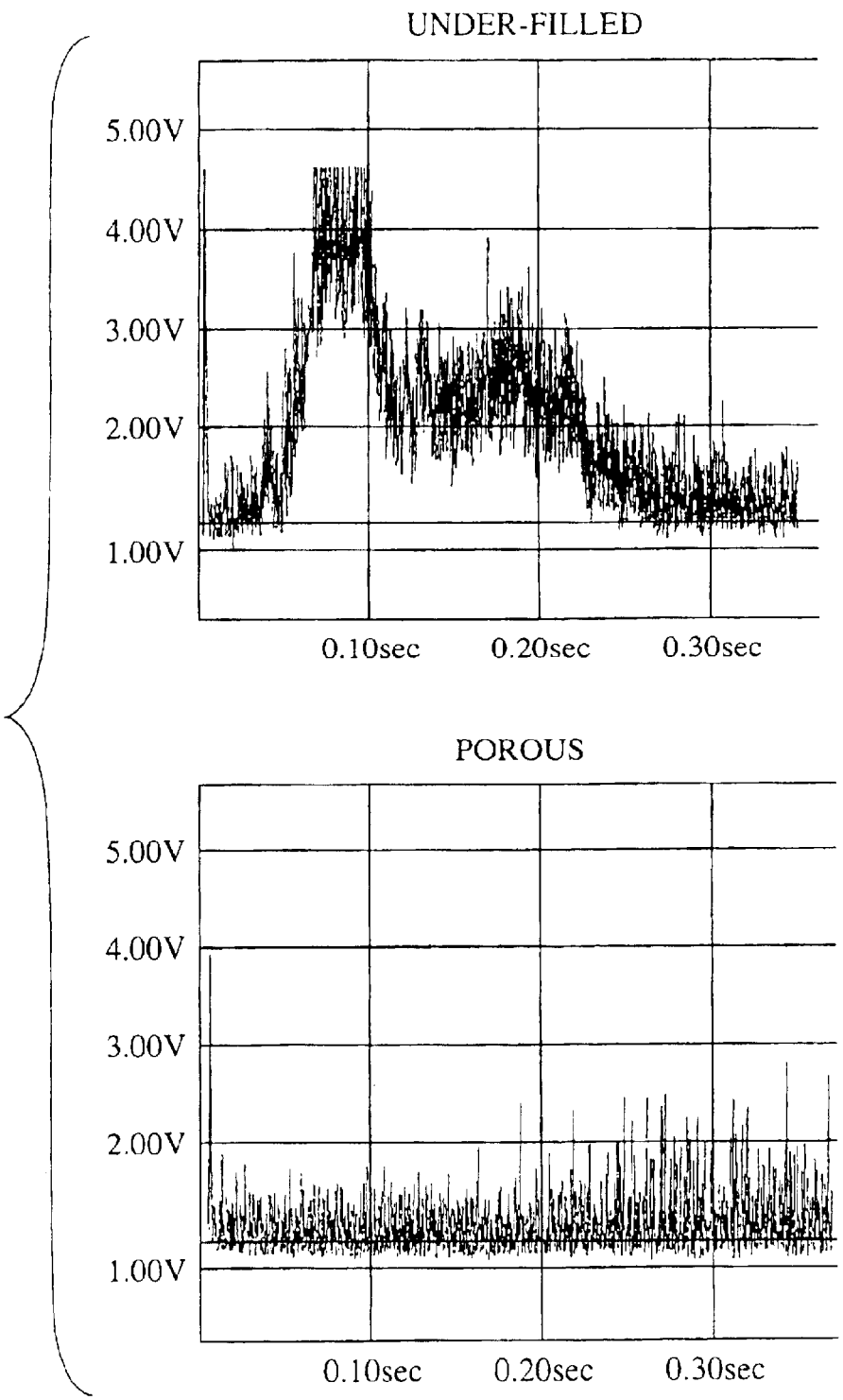
FIG. 20 is a set of waveform graphs each respectively of an electrical detection signal representing varying intensities of infrared rays of reflected light of YAG laser beam in a welding accompanied by an under-filled state or a porous state under the reference welding conditions.
Figure 21:
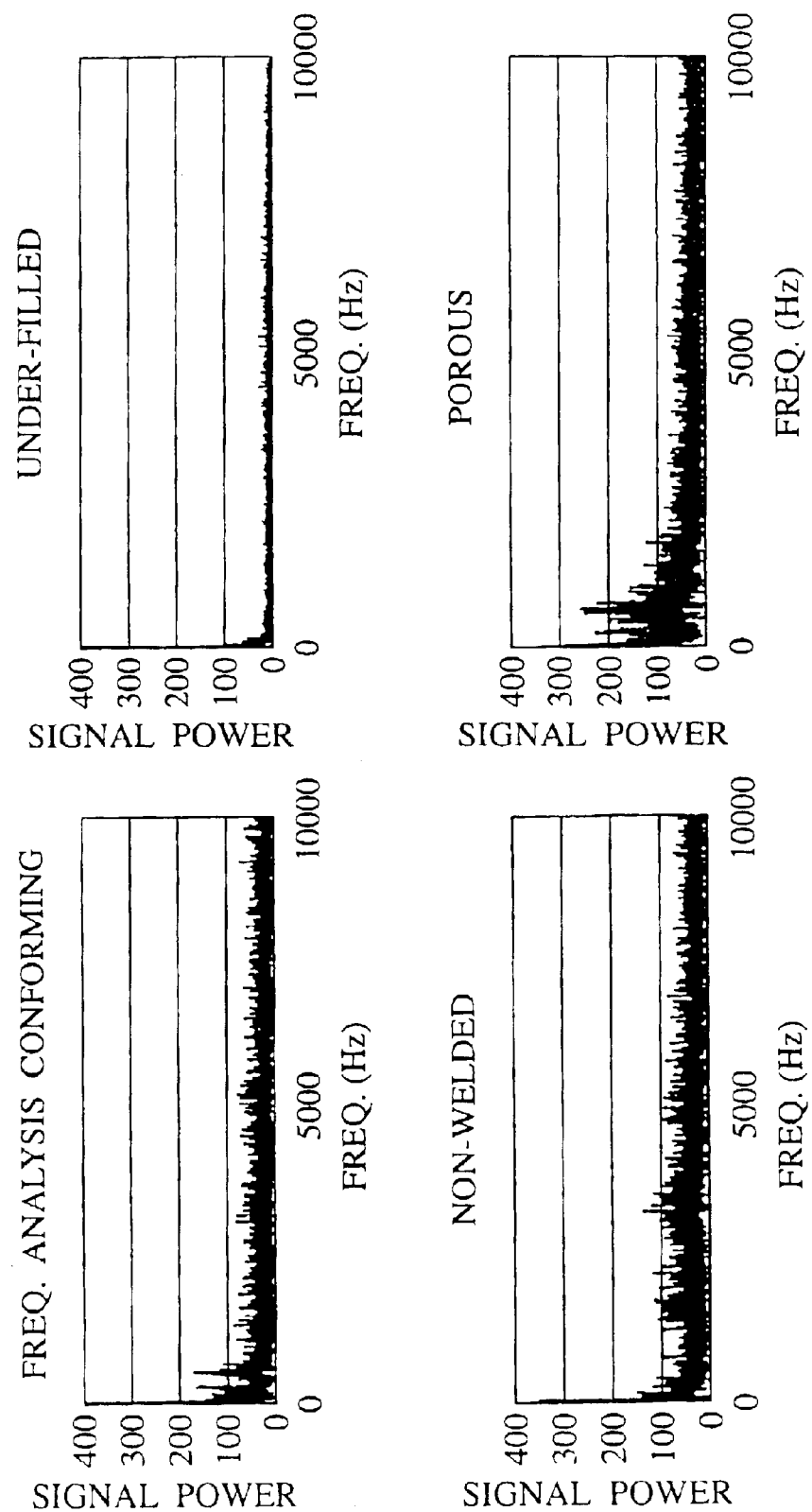
FIG. 21 is a set of waveform graphs representing spectral signal power after FFT operations of signal intensities of the electrical detection signals of FIG. 19 and FIG. 20.

There will be described below various functions of the quality monitoring system QMS according to the present embodiment of the invention, with reference to FIG. 1 to FIG. 7 and FIG. 17 to FIG. 25. FIG. 18 is a flowchart of processes (in the computer 7e) for monitoring a quality of lap-weld to be free of significant under-filled, porous, or non-welded state. FIG. 19 to FIG. 21 illustrate data obtained for spectral analyses of light detected by first and second sensors 6a, 6b under the following reference welding conditions: YAG laser output, 3 kw at a welding part WP; panel members 5a, 5b, Zn-plated steel sheets 0.8 min thick each; and welding speed, 4.5 m/min.

It is noted that the present embodiment is adapted also for detection of a non-welded state, which is a non-conforming state of weld unable to provide a required weld strength. FIG. 17 shows a typical non-welded state between a pair of upper and lower panel members (i.e. Zn-plated steel sheets) 5a, 5b lapped to be welded. The non-welded state is caused by an excessive inter-sheet gap 40, which obstructs sufficient heat transmission to the lower member 5b, resulting in an insufficient melting at the welding part.

As described with reference to FIG. 5, as a YAG laser beam LB3 is irradiated to a welding pan WP in a lapped portion 20 of panel members 5a, 5b, the welding part WP has a melt region 26 with a keyhole 25 formed by a plume 28 developed therethrough. The plume 28 and wall of the keyhole 25 are very hot, and radiate visible rays of light and infrared rays, which are detected by the first and second sensors 6a and 6b, together with such rays of laser beam L33 that are reflected from the wall of keyhole 25. Detected rays of light are converted into four electrical analog detection signals E11, E12 and E21, E22 (FIG. 3), which are processed in measuring circuits MC (71a, 71b and 72a, 72b) (FIG. 2), to provide a group of four digital detection signals Eb (whole spectral components), and another group of four digital detection signals Ed (exclusive spectral components). At a step S21 of the flowchart of FIG. 18, four sets of thus obtained signals Eb, Ed are sampled in order by the computer 7e, and stored in the memory 7g.

FIG. 19 and FIG. 20 are waveform graphs of stored data on intensities of filtered infrared rays of light from the welding part WP, i.e., on electrical detection signals (Eb for L11 and L21) obtained from reflection substantially of YAG laser beam under the above-noted reference welding conditions. The data are sampled in the computer 7e at a sampling frequency of 20 kHz. In the waveform graphs, the ordinate and abscissa represent a signal intensity (amplitude in voltage) and a lapse rime, respectively. There are shown time-dependant variations of infrared reflection intensities caught by the first sensor 6a high of observation angle. In FIG. 19, upper and lower graphs show waveforms of signal intensity for a "conforming bead section" that has a conforming quality of weld and a "non-welded bead section" that has an incomplete weld, respectively. In FIG. 20, upper and lower graphs show waveforms of signal intensity for an "under-fined bead section" that has an under-filled weld and a "porous bead section" that is significant in porosity of weld, respectively. As is apparent from comparison of those graphs, the under-filled bead section is different in waveform from any other bead section, so that the decision for an under-filled stare can be easily made. However, the non-welded and porous bead sections appear little different in waveform from the conforming bead section, so that it is difficult to see through weld qualities of the former bead sections by observation of their waveforms.

Like this, it is difficult for a simple examination of temporal intensity variations of reflected light to conclude a distinction between conforming bead section and non-welded bead section, as well as between conforming bead section and porous bead section. Therefore, at a step S22 of the flowchart of FIG. 18, among waveform data stored in the memory 7g, data on waveforms representing temporal variations of such infrared rays of light that are reflected at a current welding part and caught by the first sensor 6a high of observation angle are read in the computer 7e, where they are processed by a programmed operator for calculating an FFT of their signal intensities.

FIG. 21 shows a set of power distribution waveform graphs of data obtained by applying the FFT operator to the waveforms shown in FIG. 19 and FIG. 20. in the waveform graphs, the ordinate and abscissa represent a level of relative signal power and a frequency, respectively. The relative signal power is given as a dimensionless quantity (area) representing how many signal components of associated frequency are contained.

As will be apparent from FIG. 21, the FFT operation of signal intensity provides a distribution of relative signal power which has a significant difference among conforming bead section, non-welded bead section, under-filled bead section, and porous bead section. In this embodiment, such a difference of power distribution is evaluated for the weld quality monitoring to be ensured, in the following manner.

In waveform graphs of FIG. 21 obtained by FFT operation of signal intensities, there is set for detection of under-filled state a first frequency band ranging 0 to 1000 Hz, and, likewise, for detection of porous state a second frequency band ranging 0 to 1000 Hz. The setting of such frequency bands is based on experimental results that show occurrences of under-filled state and porous state can be clearly detected in those frequency bands. Although the first and second frequency bands are set to be identical in this embodiment, the (second) frequency band to be effective for detection of a porous state needs to be changed in dependence on sheet thickness (sum) and welding speed, as described in the first embodiment. For a certain sheet thickness or welding speed, therefore, the second frequency band for detection of porous state may preferably be changed, for example, to a range of 0–600 Hz.

In addition, for detection of a non-welded state, there is set a third frequency band ranging 3000 Hz to 6000 Hz. As is apparent from FIG. 21, when non-welded state occurs, signal power of this frequency band tends to go higher than signal power when under-filled state or porous state occurs. The setting of this frequency band also is based on experimental results that show occurrences of non-welded state can be clearly detected there.

Figure 22:
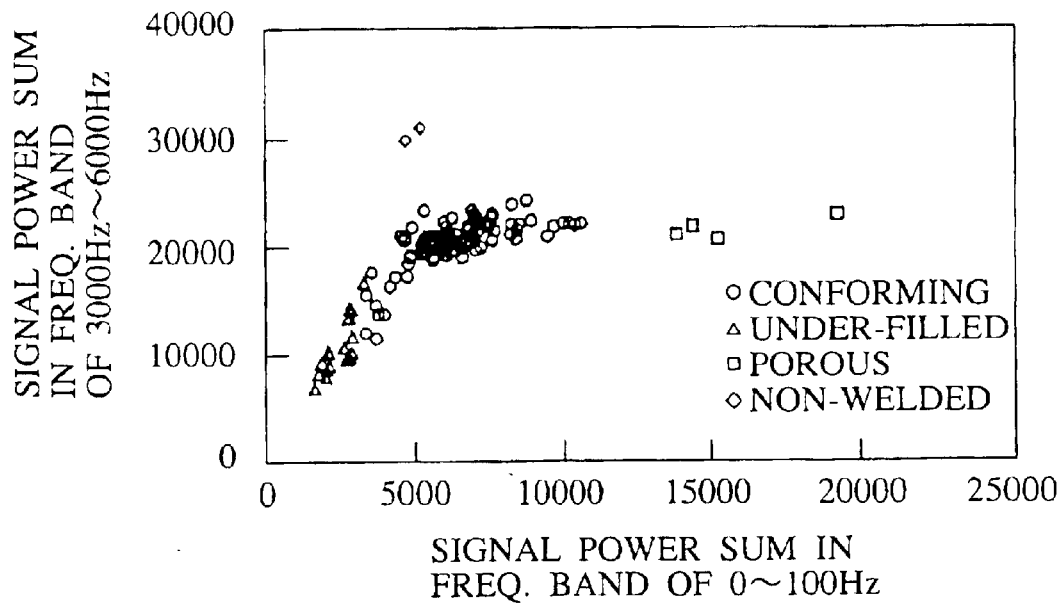
FIG. 22 is a graph illustrating respective distributions of signal power sum data associated with the under-filled state, porous state, non-welded state, and conforming state.

Signal power sum of those frequency bands are determined and mapped on an imaginary two-axis coordinate system, as illustrated in FIG. 22 In the imaginary coordinate system, the ordinate and abscissa represent signal power sums in the (first and second) frequency bands ranging 0 Hz to 1000 Hz, and a signal power sum in the (third) frequency band ranging 3000 Hz to 6000 Hz, respectively.

For example, in the case of an under-filled bead section which provides such a waveform as shown in an upper right graph of FIG. 21, there is determined a combination of an area defined by a waveform within the frequency band ranging 0 Hz to 1000 Hz and an area defined by a waveform of the frequency band ranging 3000 Hz to 6000 Hz, and this combination is mapped on a coordinate of which the ordinate and abscissa correspond to those areas. By such mapping, it is observed that under-filled bead sections (triangular mark) tend to be distributed within a sub-region that is relatively small of signal power sums of ordinate and abscissa of the two-axis coordinate system. Likewise, porous bead sections (square mark) tend to be distributed within a sub-region that is relatively small of signal power sum of ordinate and relatively large of signal power sum of abscissa of the two-axis coordinate system, and non-welded bead sections (rhombus mark) tend to be distributed within a sub-region that is relatively large of signal power sum of ordinate and extends over an entire section of axis of abscissa of the two-axis coordinate system. Further, it is observed that conforming bead sections (round mark) tend to be distributed within a sub-region that is relatively small of signal power sum of ordinate and extends over an intermediate section of axis of abscissa of the two-axis coordinate system.

Figure 23:
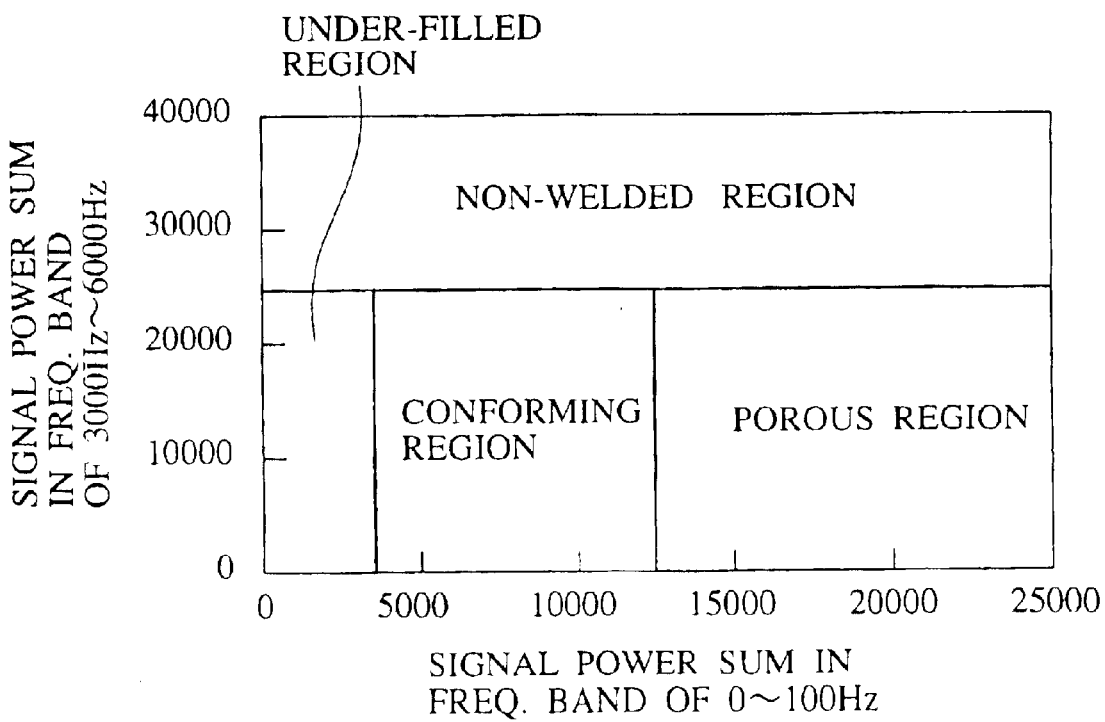
FIG. 23 is a graph having a region of two-axis coordinate system mapped thereon and divided into sub-regions covering respective sets of signal power sum data associated with the under-filled state, porous state, non-welded state, and conforming state.
Figure 24:
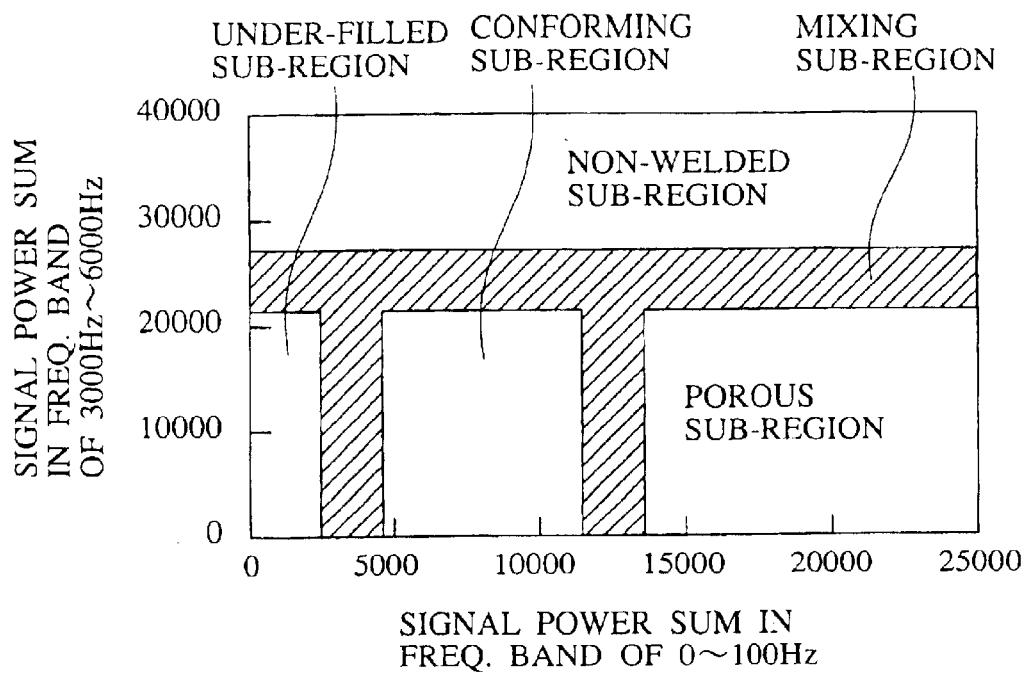
FIG. 24 is a graph having the region of two-axis coordinate system mapped thereon with a boundary region covering mixed signal power sum data.

An investigation was made of a multiplicity of welded bead sections to know how under-filled bead sections, porous bead sections, non-welded bead sections, and conforming bead sections thereof are distributed in a region of two-axis coordinate system, with an observed result that they are distributed within such separate sub-regions as shown in FIG. 23. It is supposed that if under-filled state, porous state, and/or non-welded state occur in combination at a single welding part of bead, they should be distributed in a vicinity of a boundary between associated sub-regions. Therefore, in this embodiment, as illustrated in FIG. 24, there is provided a complex or mixing sub-region difficult of discrimination of a type of weld quality. Accordingly, in the imaginary region of two-axis coordinate system, there exist an under-filled sub-region, a conforming sub-region, a porous sub-region, a non-welded sub-region, and a mixing sub-region. It is noted that the term "sub-region" is for relative expression and may well be read simply "region". It may depend on a result of practice how wide the width of mixing sub-region should be set.

It also is noted that the imaginary region of two-axis coordinate system is prepared in the computer 7e, and those sub-regions are in no way given as actual two-dimensional planes. Although, after respective FFT operations of signal intensities, their results are mapped on the imaginary region of two-axis coordinate system, such a mapping is not actually made on a two-dimensional plane. Signal power sums constituting respective sub-regions have their numerical ranges, which are stored in the memory 7g, allowing for the computer 7e to make a prompt decision as to whether a non-conforming state occurs or whether an observed bead section is conforming, depending on which sub-region the result of operation belongs to.

Referring again to the flowchart of FIG. 18, at a step S23, on the basis of data given, while welding, on such a waveform as shown in FIG. 21, there are calculated signal power sums in frequency bands ranging 0 Hz to 100 Hz and 3000 Hz to 6000 HZ, respectively. Then, at a step S24, it is decided that a combination of coordinates in two-axis coordinate system, as it is defined by a combination of signal power sums calculated between 0 Hz to 1000 Hz and between 3000 Hz to 6,000 Hz, resides in which sub-region shown in FIG. 24.

In decision at the step S24, if the combination of coordinates belongs to a preset conforming sub-region (YES), the control flow goes to a step S25, it is decided that the welding at a welding part under observation has a conforming state (conforming bead section). On the other hand, at the step S24, unless the combination of coordinates belongs to the preset conforming sub-region (NO), the control flow goes to a step S26, where it is decided whether or not the combination of coordinates belongs to one of an under-filled sub-region, a porous sub-region, and a non-welded sub-region, as they are preset.

In decision at the step S26, if the combination of coordinates belongs to one of the under-filled sub-region, the porous sub-region, and the non-welded sub-region (YES), there should have occurred a weld state of associated sub-region, and the control flow goes to a step S27, where it is decided that the welding part under observation has a non-conforming weld quality. It is noted that the decision for a conforming bead section as well as decision for any non-conforming State of weld is indicated by a display 7f. With the foregoing process complete, an entire decision an a welding part under observation goes to an end.

On the other hand, in decision at the step S26, unless the combination of coordinates belongs to one of the under-filled sub-region, the porous sub-region, and the non-welded sub-region (NO), that is, if it belongs to such a mixing sub-region as shown in FIG. 24, then it becomes necessary to divide the welding part under observation into a plurality of sub-sections, as shown in FIG. 25, to again make a decision on each sub-section as to whether its weld quality is conforming or not.

Figure 25:
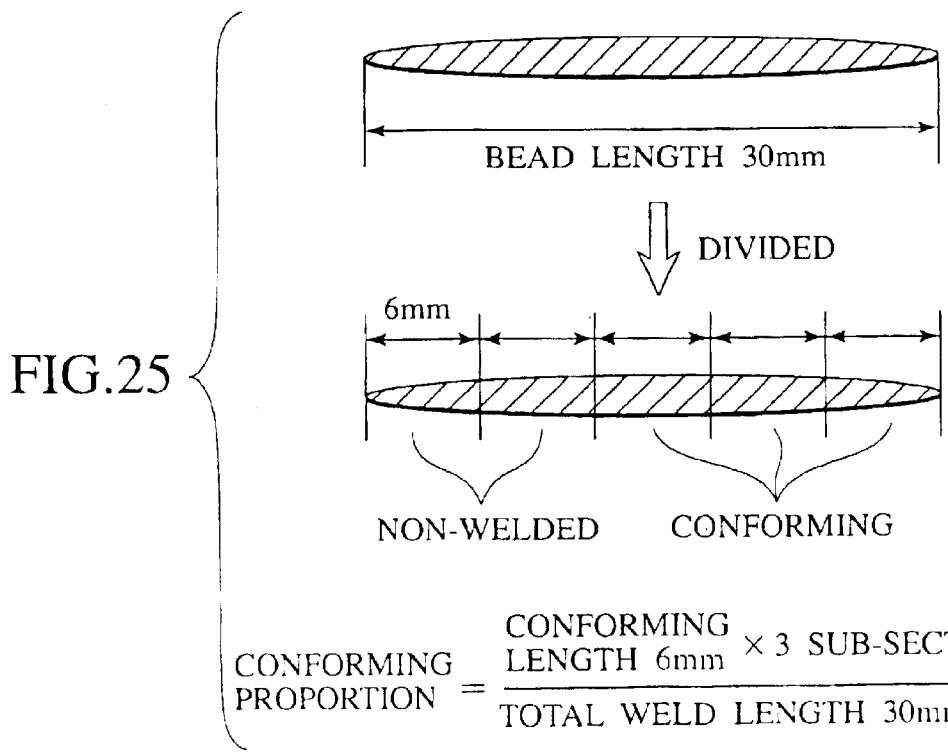
FIG. 25 is an illustration describing a procedure of a decision to be again made of whether the quality of weld under observation is conforming or not.

The decision to be again made of whether the weld quality is conforming or not is performed in the following procedure:

As described, for a single welding part under observation, the electrical detection signal E1 output from the first sensor 6a has time-dependant variations associated therewith, of which data is stored in The memory 7g of quality monitor QM, which is read in the computer 7e, where a field of the data representing the time-dependant variations of the electrical detection signal E1 is divided into a plurality of sub-sections of the field as a temporal sequence. For example, assuming that a welding part under observation represents a section of bead 30 mm in length, as shown in FIG. 25, the bead section under observation is divided into five sub-sections each having a 6 mm length, and a decision is made of a respective one of the sub-sections, for which quality of weld to occur or if it is conforming, in a manner quite identical to an upper part of the flowchart of FIG. 18.

As this division of a data section is applied to a stored data of the electrical signal E1, it takes a time interval of 0.4 sec to weld the 30 mm bead section by a welding speed to be 4.5 m/sec in this embodiment, which means that the bead section under observation is represented by a length of stored data corresponding to a fraction of 0.4 sec of the electrical signal. As this data is divided into five sub-sections, the fraction of 0.4 sec of electrical signal is divided into a temporal sequence of sub-fractions of electrical signal each corresponding to a time slot of 0.08 sec. This division provides, for the bead section under observation, a sequence of data on sub-fractions of electrical signal appearing in a first sub-interval of time ranging 0 sec to 0.08 sec, a second sub-interval of time ranging 0.08 sec to 0.16 sec, a third sub-interval of time ranging 0.16 sec to 0.24 sec, a fourth sub-interval of time ranging 0.24 sec to 0.32 sec, and a fifth sub-interval of time ranging 0.32 sec to 0.4 sec. Although it is preferable to set the bead section within a length range of about 1 mm to about 8 mm, this length may well be varied, as necessary, depending a configuration of the bead section and the accuracy of weld quality decision to be desirable.

Data on sub-fractions of electrical signal corresponding to sub-intervals of time are stored in the memory 7g. At a step S28 of the flowchart of FIG. 18, those data are read one by one in the computer 7e, where their waveforms of signal intensities are processed by the FFT operator. As a result, at a step S29, there are calculated a combination of signal power sums within the frequency bands ranging 0 Hz to 1000 Hz and 3000 Hz to 6000 Hz, respectively. Then, at a step S30, it is decided in which one of sub-regions of two-axis coordinate system shown in FIG. 24 a coordinate corresponding to the combination of signal power sums in the frequency bands of 0 Hz to 1000 Hz and 3000 Hz to 6000 Hz resides. At this stage of process, such a decision is made that, for example, as shown in FIG. 25, there appears a non-welded state in a sub-section (the leftmost one in FIG. 25) of bead section corresponding to the first sub-interval of time, another non-welded state in a sub-section (neighboring to the right of the leftmost one) of bead section corresponding to the second sub-interval of time, and a conforming state in each of the remaining sub-sections (up to the rightmost one) of bead section corresponding to the third to fifth sub-intervals of time.

Next, at a step S31, there is calculated a conforming proportion of the bead section under observation. In the above-noted case, two of five sub-sections are each non-conforming in quality of weld, with the rest conforming, so that the conforming proportion is 60%.

Then, at a step S32, if the number of sub-sections decided to be conforming exceeds a preset proportion (e.g. 70%) of conforming sub-section relative to the number of divided sub-sections (YES), the control flow goes to a step S33, where it is concluded that the re-examined bead section is conforming as a whole. This is because the bead section actually corresponds to a length of continuous bead preset to be longer than a required length for a sufficient weld strength, which means the actual bead section includes an allowance for probable occurrences of non-conformity, such as an under-filled, porous, and/or non-welded points. Therefore, if a section of bead under observation has a calculated conforming length exceeding the required length, the bead section may well be considered to be conforming as a whole.

On the other hand, at the step S32, unless the number of sub-sections decided to be conforming exceeds the preset proportion (e.g. 70%) of conforming sub-section relative to the number of divided sub-sections (NO), the control flow goes to a step S34, where it is concluded that the re-examined bead section has under-filled, porous, and/or non-welded parts, so that it is non-conforming as a whole. It is noted that the display 7f indicates the conclusion of re-examined bead section to be conforming or non-conforming as a whole.

Like this, in this embodiment, even if an entirety of bead section as a welding part is once decided to be problematic in weld quality, the bead section is re-examined to know whether the conforming proportion is sufficient, so that the resultant conclusion has an increased accuracy, assuring an enhanced proportion of conforming bead without problem.

The foregoing monitoring process is performed in a real-time manner, that is, substantially at the same time as the welding. Even if the re-examination of a current welding part is performed, the conclusion is given before entering the monitoring of a subsequent welding part. If a welding part is finally concluded to be problematic in weld quality, then the welding part is marked by blasting a paint thereto, Although a fabricated vehicle body panel may have tens of welding parts, the paint marking facilitates a final inspection in a post-process. In the final inspection, paint-marked parts of any panel may well be again visually checked for non-conformity in weld quality. If a vehicle panel is concluded to be problematic in weld quality, this panel is transferred to a back-up process, where it is repaired.

In the foregoing process of this embodiment, the sheet thickness sum or welding speed is kept constant. However, though depending on the sheet thickness sum, welding speed, or aspect ratio, there inherently is an optimal frequency for decision on an occurrence of porous state, as described in the first embodiment. Therefore, like the first embodiment, the second embodiment may also have a frequency (i.e. the second frequency band) varied in dependence on the sheet thickness sum, welding speed, or aspect ratio.

In the second embodiment, respective decisions for occurrences of porous, under-filled, and non-welded states can be processed by a single operation program without providing various complicate operation programs for detection of different kinds of non-conformity of weld quality. Therefore, associated CPU is allowed to have a quite decreased burden imposed thereon for such operation.

Further, in this embodiment, by decision after subdivision of a bead section, even a part of the bead section can also be monitored with ease for any state of weld quality, allowing for an enhanced accuracy of decision on a degree of kind of weld quality to occur.

Figure 26:
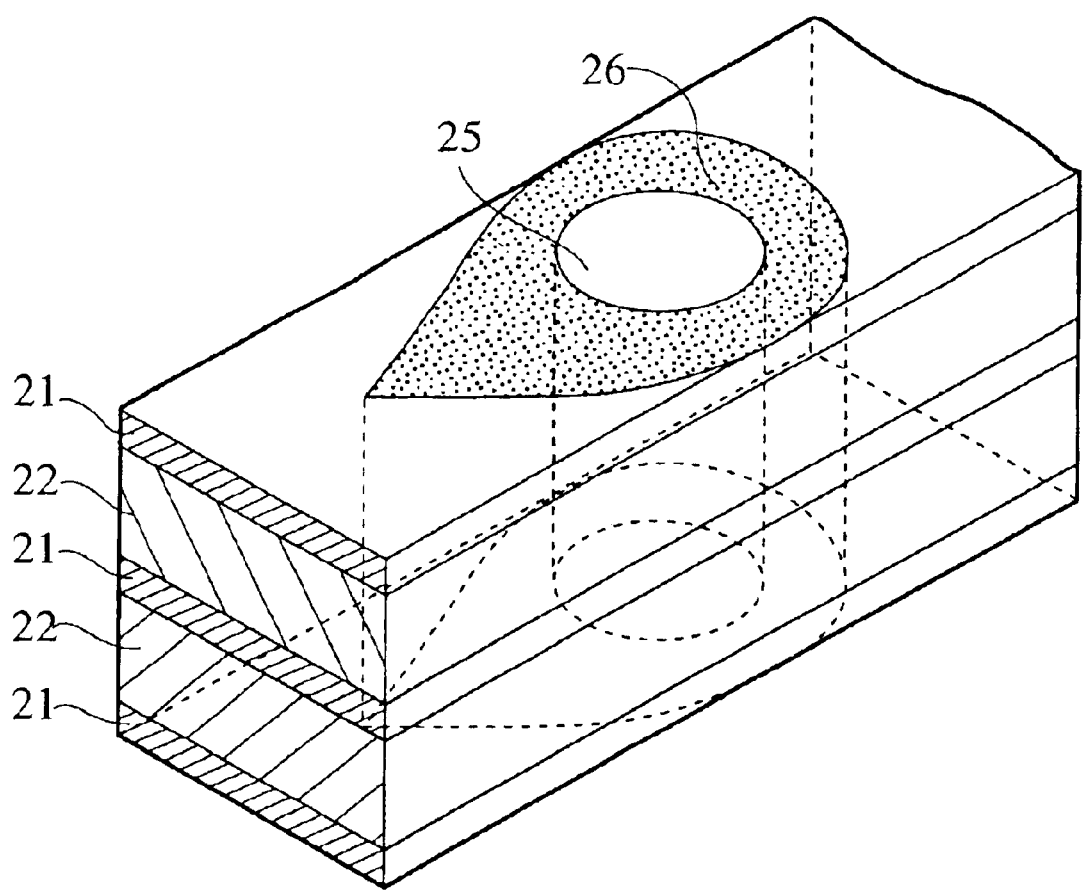
FIG. 26 is an illustration of a vibration model of a melt region at a welding part of a lap weld.

FIG. 26 is an illustration of a vibration model of a melt region 26 formed with a keyhole 25, at a laser welding part of a lap weld between steel sheets 22 with Zn plating 21. The vibration model is configured like an eye drop extending upstream the welding direction in plan, and has a height equivalent to an apparent thickness sum of work (i.e. Zn-plated steel sheets 22). The lobe of a basic vibration of the model is open (for free vibrations) at both top and bottom surfaces of the work, and dose (with forced vibrations) at a vertical center where vaporized metal of inter-sheet layers of the Zn-plating 21 is discharged as jets.

The contents of Japanese Patent Application No. 2001-048756 and Japanese Patent Application No. 2001-381889 claiming a domestic priority of the former are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A laser weld quality monitoring method comprising:
   welding a part of work with a laser beam irradiated thereon from a YAG laser;
   detecting a varying intensity of light from the welding part to provide a detection signal;
   determining a value of signal power of a frequency spectrum in a specified frequency band of the detection signal, the specified frequency band having a specific relation with a porous state of the welding part; and
   making a decision for the porous state of the welding part;
      to be significant as the value of signal power exceeds a threshold of weld quality, and
      to be insignificant as the value of signal power does not exceed the threshold of weld quality.

2. A laser weld quality monitoring method according to claim 1, wherein the detection signal comprises a varying electrical signal representing the varying intensity of the light from the welding part, and the determining the value of signal power comprises calculating a set of frequency spectra of the varying electrical signal.

3. A laser weld quality monitoring method according to claim 1, wherein the specified frequency band is varied depending on one of a thickness of the work, a welding speed, and an aspect ratio of a keyhole at the welding part.

4. A laser weld quality monitoring method according to claim 1, wherein the determining the value of signal power comprises one of passing the electrical signal to a band-pass filter and applying a Fourrier transform to data of the electrical signal.

5. A laser weld quality monitoring method comprising:
   irradiating a laser beam from a YAG laser to a welding part of work;
   detecting light reflected from the welding part;
   calculating a frequency distribution from a set of data of the detected light within an interval of time;
   calculating, from the frequency distribution, a first signal power sum in one of a first frequency band for detecting an under-filled state and a second frequency band for detecting a porous state, and a second signal power sum in a third frequency band for detecting a non-welded state;
   mapping a combination of calculated values of the first and second signal power sums, in a region defined by a combination of a first axis representing the first signal power sum and a second axis representing the second signal power sum, including a sub-region representing a non-conforming state as one of the under-filled state, the porous state, and the non-welded state; and
   making a decision for the welding part to have the non-conforming state, as the combination of calculated values is mapped in the sub-region.

6. A laser weld quality monitoring method according to claim 5, wherein the calculating the frequency distribution comprises converting the detected light into an electrical signal, storing data on time-dependant variations of the electrical signal, and calculating the frequency distribution from the stored data.

7. A laser weld quality monitoring method according to claim 5, wherein the region includes sub-regions representing the under-filled state, the porous state, and the non-welded state, respectively.

8. A laser weld quality monitoring method according to claim 5, wherein the region includes a sub-region representing a conforming state of the work.

9. A laser weld quality monitoring method according to claim 5, wherein the region includes a sub-region representative of at least tow of the under-filled state, the porous state, and the non-welded state.

10. A laser weld quality monitoring method according to claim 5, further comprising:
    calculating, from a subset of the set of data, a subsidiary frequency distribution of the detected light within a sub-interval of the interval of time;
    calculating, from the subsidiary frequency distribution, a first subsidiary signal power sum in one of a first subsidiary frequency band for detecting an under-filled state in a sub-section of the welding part corresponding to the sub-interval and a second subsidiary frequency band for detecting a porous state in the sub-section, and a second subsidiary signal power sum in a third subsidiary frequency band for detecting a non-welded state in the sub-section;
    mapping in the region a combination of calculated subsidiary values of the first and second subsidiary signal power sums;
    making a decision for the sub-section of the welding part to have the non-conforming state, as the combination of calculated subsidiary values is mapped in the sub-region; and
    concluding a weld quality of the welding part based on the decision for the sub-section.

11. A laser weld quality monitoring method according to claim 10, wherein the concluding the weld quality depends on a conforming proportion of the sub-section to the welding part.

12. A laser weld quality monitoring method according to claim 10, wherein one of the first, second, and third subsidiary frequency bands is varied depending on one of a thickness of the work, a welding speed, and an aspect ratio of a keyhole at the sub-section of the welding part.

13. A laser weld quality monitoring system comprising:
    a welder configured to weld a part of work with a laser beam irradiated thereon from a YAG laser;
    a detector configured to detect a varying intensity of light reflected from the welding part to provide a detection signal;
    a value determiner configured to determine a value of signal power of a frequency spectrum in a specified frequency band of the detection signal, the specified frequency band having a specific relation with a porous state of the welding part; and
    a decision-maker configured to make a decision for the porous state of the welding part:
       to be significant as the value of signal power exceeds a threshold of weld quality, and to be insignificant as the value of signal power does not exceed the threshold of weld quality.

14. A laser weld quality monitoring system comprising:

welding means for welding a part of work with a laser beam irradiated thereon from a YAG laser;

detecting means for detecting a varying intensity of light reflected from the welding part to provide a detection signal;

value determining means for determining a value of signal power of a frequency spectrum in a specified frequency band of the detection signal, the specified frequency band having a specific relation with a porous state of the welding part; and decision-making means for making a decision for the porous state of the welding parts:
 to be significant as the value of signal power exceeds a threshold of weld quality, and
 to be insignificant as the value of signal power does not exceed the threshold of weld quality.

15. A laser weld quality monitoring system comprising:

a laser welder configured to irradiate a laser beam from a YAG laser to a welding part of work;

a detector configured to detect light reflected from the welding part;

a calculator configured to calculate a frequency distribution from a set of data of the detected light within an interval of time;

a calculator configured to calculate, from the frequency distribution, a first signal power sum in one of a first frequency band for detecting an under-filled state and a second frequency band for detecting a porous state, and a second signal power sum in a third frequency band for detecting a non-welded state;

an operator configured to map a combination of calculated values of the first and second signal power sums, in a region defined by a combination of a first axis representing the first signal power sum and a second axis representing the second signal power sum, including a sub-region representing a non-conforming state as one of the under-filled state, the porous state, and the non-welded state; and a decision-maker configured to make a decision for the welding part to have the non-conforming state, as the combination of calculated values is mapped in the sub-region.

16. A laser weld quality monitoring system comprising:

laser welding means for irradiating a laser beam from a YAG laser to a welding part of work;

detecting means for detecting light reflected from the welding part;

calculating means for calculating a frequency distribution from a set of data of the detected light within an interval of time;

calculating means for calculating, from the frequency distribution, a first signal power sum in one of a first frequency band for detecting an under-filled state and a second frequency band for detecting a porous state, and a second signal power sum in a third frequency band for detecting a non-welded state;

operator means for mapping a combination of calculated values of the first and second signal power sums, in a region defined by a combination of a first axis representing the first signal power sum and a second axis representing the second signal power sum, including a sub-region representing a non-conforming state as one of the under-filled state, the porous state, and the non-welded state; and decision-making means for making a decision for the welding part to have the non-conforming state, as the combination of calculated values is mapped in the sub-region.

17. A laser weld quality monitoring method according to claim 1, wherein at least one of a relation between the specified frequency band and the thickness of the work, a relation between the specified frequency band and the welding speed, and a relation between the specified frequency band and the aspect ratio of the keyhole at the welding part, are stored in a memory, and the specified frequency band is determined on the basis of the relation.

* * * * *